United States Patent
Barnard et al.

(10) Patent No.: US 6,854,121 B2
(45) Date of Patent: Feb. 8, 2005

(54) COMMAND INTERFACE TO OBJECT-BASED ARCHITECTURE OF SOFTWARE COMPONENTS FOR EXTENDING FUNCTIONAL AND COMMUNICATIONAL CAPABILITIES OF NETWORK DEVICES

(75) Inventors: John Barnard, Orange, CA (US); Richard Wilson, Coto de Caza, CA (US)

(73) Assignee: Canon U.S.A., Inc., Lake Success, NY (US)

( * ) Notice: Subject to any disclaimer, the term of this patent is extended or adjusted under 35 U.S.C. 154(b) by 502 days.

(21) Appl. No.: 09/789,934

(22) Filed: Feb. 16, 2001

(65) Prior Publication Data

US 2002/0116544 A1 Aug. 22, 2002

(51) Int. Cl.[7] .................................................. G06F 1/12
(52) U.S. Cl. ...................... 719/315; 719/310; 719/311; 719/313; 719/328
(58) Field of Search .................................. 719/311, 313, 719/315, 328, 310; 709/310

(56) References Cited

U.S. PATENT DOCUMENTS 6,003,065 A * 12/1999 Yan et al. .................... 709/201
6,223,214 B1 * 4/2001 Tufty et al. .................. 709/217
6,463,583 B1 * 10/2002 Hammond ................... 717/162

OTHER PUBLICATIONS

Prosise, J., "Wicked Code", Microsoft Systems Journal, Nov. 1999.

* cited by examiner

Primary Examiner—Nabil El-Hady
(74) Attorney, Agent, or Firm—Fitzpatrick, Cella, Harper & Scinto

(57) ABSTRACT

Interfacing a plurality of virtual device container modules to a third-party application, each of the virtual device container modules being in communication with a tracker module through a software bus, including receiving an interface command at the interface module from the third-party application via a third-party connection, the interface command relating to a designated one of the plurality of virtual device container modules, establishing a direct connection between the interface module and the designated virtual device container module by using an address pointer, receiving information data, at the interface module, from the designated virtual device container module via the direct connection, the information data relating to the designated virtual device container module, and sending the information data from the interface module to the third-party application via the third-party connection.

80 Claims, 15 Drawing Sheets

STATUS_INFO 209

Dynamic tokens to monitor

| Status Token | Response Value |
|---|---|
| DEVICE_STATE | See table below |
| PAPER_JAM | 0=FALSE,1=TRUE |
| TONER_LOW | 0=FALSE,1=TRUE |
| TONER_OUT | 0=FALSE,1=TRUE |
| COVER_OPEN | 0=FALSE,1=TRUE |
| SERVICE_CALL | 0=FALSE, non-zero=TRUE (service call code) |
| FEEDER_JAM | 0=FALSE,1=TRUE |
| FINISHER_JAM | 0=FALSE,1=TRUE |
| FAX_MEMORY_FULL | 0=FALSE,1=TRUE |
| STAPLER_ERROR | 0=FALSE,1=TRUE |
| HARD_DISK_SPACE_AVAIL | Number returned in megabytes,-1=n/a |
| MEMORY_USAGE | Number returned in megabytes,-1=n/a |

230 DEVICE_STATE bit values table (gray fields may be ignored):

| Bit number | 0 | 1 | 2 | 3 | 4 | 5 | 6 |
|---|---|---|---|---|---|---|---|
| State when=1 | Valid Status | Valid Feature | Valid setup | Device Responding | Ready | Warming Up | Printing |
| Notes | Valid status has been obtained from device | Valid feature have been obtained from device | Valid setup props have been obtained from device | | | Depends on device support for this bit to be set | Depends on device support for this bit to be set |

Static Values, not monitored

| Status Token | Response Value |
|---|---|
| MEMORY_SIZE | Number returned in megabytes,-1=n/a |
| SCANNER_CAPABILITY | 0=FALSE,1=TRUE |
| FAX_CAPABILITY | 0=FALSE,1=TRUE |
| HARD_DISK_SIZE | Number returned in megabytes,-1=n/a |
| PAGES_PER_MINUTE | number |
| MAX_RESOLUTION_IN_DPI | number |
| AUTO_DOC_FEEDER | 0=FALSE,1=TRUE |
| DUPLEXER_CAPABILITY | 0=FALSE,1=TRUE |
| STAPLER_CAPABILITY | 0=FALSE,1=TRUE |
| POSTSCRIPT_CAPABILITY | 0=FALSE,1=TRUE |
| PCL_CAPABILITY | 0=FALSE,1=TRUE |

FIG. 11

TRAY_INFO 210

- TRAY NAME — 260
- PAPER TYPE — 261
- PAPER LEVEL — 262

| Value | Level | State |
|---|---|---|
| 0 | Empty | ALARM |
| 1 | Not Empty (At least one sheet of paper) | |
| 25 | 1/4 Full | WARNING |
| 33 | 1/3 Full | WARNING |
| 50 | 1/2 Full | |
| 66 | 2/3 Full | |
| 75 | 3/4 Full | |
| 100 | Full | |
| 128 | Open | ALARM |
| 255 | n/a (not supported) | |

| Setting Token 211 | Description | Maximum Length |
|---|---|---|
| DEVICE_NAME | The name of the device | 19 |
| LOCATION | The location of the device | 19 |
| CONTACT_NAME | The contact name for the device | 19 |

*FIG. 13*

| Control Token 212 | Action |
|---|---|
| TEST_PRINT | Sends a test print request to the device. |
| REBOOT | Reboots the device's NIC. |
| RESET_FACTORY_DFLTS | Resets the device's print settings to their factory default |

*FIG. 14*

| ERROR_IND 208 | Description |
| --- | --- |
| 0 | Success, the command executed successfully. |
| -1 | Not enough arguments were given in command line. |
| -2 | Command not implemented (currently returned when FSA is specified for second argument). |
| 1 | Information not available (e.g. the device_identifier is not for a valid device, the information for the device has not been obtained yet), or operation not supported. |
| 100+ | Command argument is invalid (the value minus 100 will indicate which argument is bad (1 relative). For example, 102 indicates that argument 2 is invalid (should be VDC or FSA). |

FIG. 15

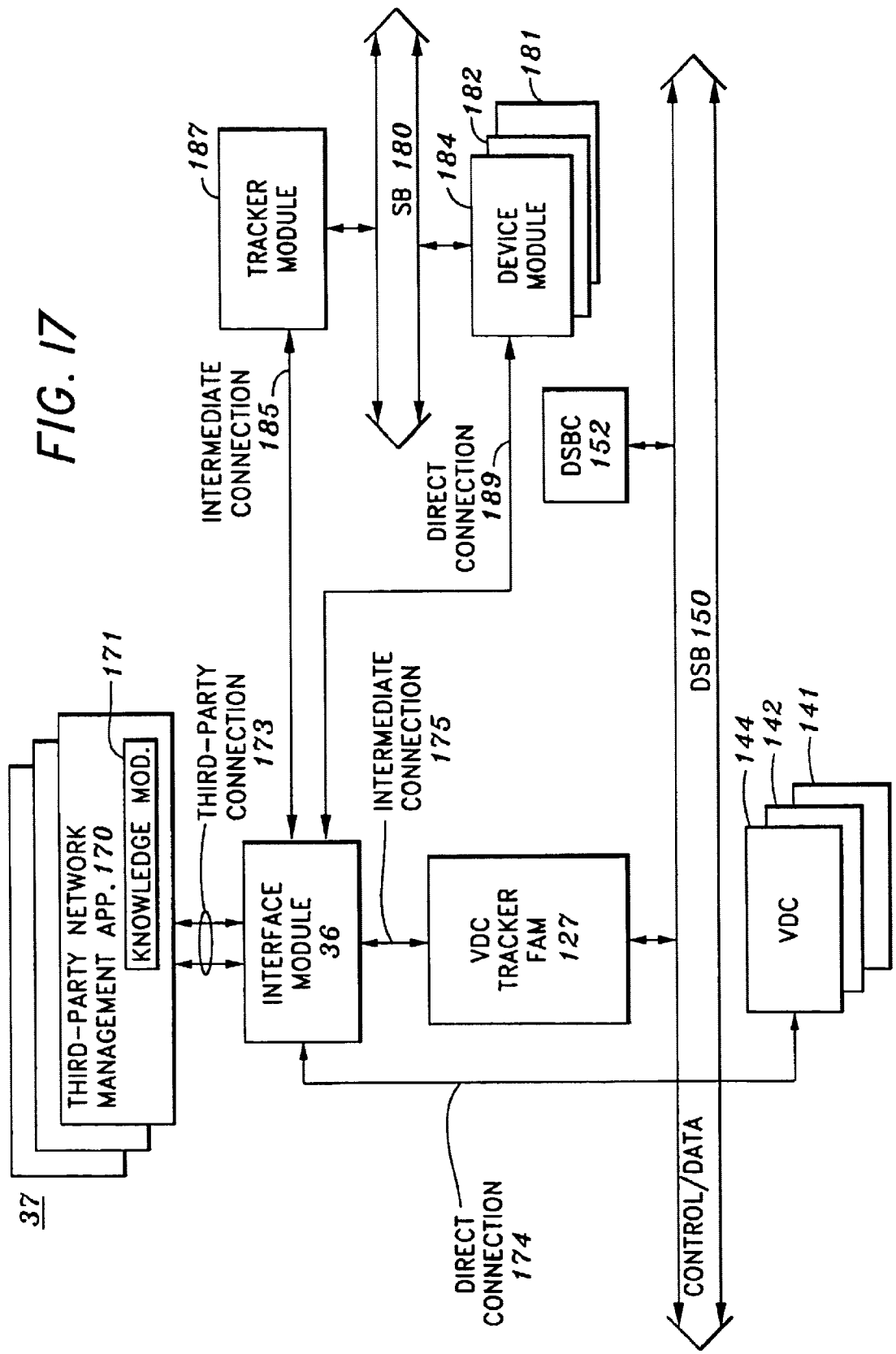

COMMAND INTERFACE TO OBJECT-BASED ARCHITECTURE OF SOFTWARE COMPONENTS FOR EXTENDING FUNCTIONAL AND COMMUNICATIONAL CAPABILITIES OF NETWORK DEVICES

INCORPORATION BY REFERENCE

U.S. patent application Ser. No. 09/664,531, entitled "Object-Based Architecture For Supporting Network Devices," filed Sep. 18, 2000, is incorporated by reference as if fully set forth in full herein.

BACKGROUND OF THE INVENTION

1. Field of the Invention

The invention concerns an object-based architecture of software components for extending the functional and communication capabilities of existing network devices in a network environment. Specifically, the invention utilizes modular software components to provide a virtual device for extending the functional capability of a network device in order to support enterprise applications.

2. Description of the Related Art

Typically, computing network environments are comprised of numerous network elements, such as workstations and servers, in addition to several types of network devices, such as network printers, network scanners, and the like. For example, a network enterprise may consist of several different network servers and a large number of network devices, such as network printers and network scanners, wherein the functional capabilities of each network device are accessible to the users of the network enterprise through workstations on the network.

The accessibility to the functionality of the various network devices allows each user on the network to utilize the network devices as if they were local peripheral devices to the user's workstation. In this manner, the servers, workstations and other network devices on the network all communicate via the network using a common network protocol, such as TCP/IP, in order to make themselves visible for access and use by other network elements.

The architecture of such a network enterprise facilitates the implementation of enterprise-wide functionality for managing and/or utilizing the capabilities of the network devices on the network. For example, many different enterprise applications have been developed for use in network environments which provide functionality to efficiently use and communicate between the various network elements in a coordinated fashion. An enterprise application may be executed within a single server or computing device on the network, or may be processed in a distributed manner among several servers and/or computing devices on the network. For example, an enterprise e-mail application may be implemented in a server on a network to facilitate e-mail communication among all network elements in the network enterprise. Accordingly, an e-mail client containing the appropriate e-mail functionality is typically provided in each workstation in order for the workstations to functionally support the enterprise e-mail enterprise. Other examples of enterprise applications include, but are not limited to, network management applications for controlling network configurations and settings of the network elements, policy management applications for managing the use of the network elements, job accounting management applications for tracking the use of the network elements, and security applications for ensuring secure use of the network elements.

Recently, a growing trend among developers of network devices, such as printers and scanners, is to include enterprise application client functionality in the network device, thereby allowing the network device to support the corresponding enterprise applications on the network. Accordingly, it can be appreciated that new network devices are being developed to include embedded functional capability to not only support existing enterprise applications, such as e-mail, but also to support developing enterprise applications, such as policy management and security applications. In this manner, the users of the network, such as a user at a workstation on the network, will have the benefit of accessing and utilizing increased functional capabilities of the network devices, such as e-mail printing to a network printer, through the use of enterprise applications.

As new network devices are added to the network which include the functional capability to support enterprise applications, the network environment becomes a heterogeneous environment of newer network devices that support enterprise applications of legacy devices that are not capable of supporting such enterprise applications. In addition, even among those newly-added network devices which have the capability to support enterprise applications, there is likely to be a disparity of the type and level of embedded functional capability to support the various enterprise applications. For example, a newly-added network printer may have the embedded functionality to support an enterprise e-mail application and a network management application, whereas another newly-added network printer may only support the enterprise e-mail application in a limited fashion and may not support the network management application at all.

In addition to lacking the capability to support enterprise applications, many of the network devices, especially the legacy network devices, may only support limited sets of communications protocols, thereby inhibiting their ability to communicate with other network devices which utilize other communication protocols. Accordingly, it can be appreciated that existing, and particularly newly-developed, enterprise applications may have limited overall support within the network enterprise because of the limited number of network devices that have the embedded functional capability to support such enterprise applications. In addition, the functional capabilities of some network devices which utilize particular communications protocols to access and utilize the functions of other network devices is limited by the network devices which cannot support such protocols.

It is therefore desirable to maintain a network enterprise in which all network devices support each of the enterprise applications and communication protocols available across the network enterprise. This implementation of this goal is restricted, however, by the limited capabilities of legacy network devices in the network enterprise, and also by the disparate functional capabilities of newly-developed network devices. Accordingly, there is a need for extending the functional capabilities of network devices, especially legacy network devices, so as to enable the network devices to have the functional capability necessary to support the desired enterprise applications. In addition, there is a need to extend the communications capabilities of the network devices, especially legacy network devices, to support the desired communication protocols on the network.

One solution to the aforementioned problems is presented in the above-referenced U.S. patent application Ser. No. 09/664,531, entitled "Object-Based Architecture For Supporting Network Devices," in which an object-based architecture is presented for virtually extending the capabilities of network devices. As described in the aforementioned application, the architecture includes virtual device container modules which are executed on a computing device connected to a network on which legacy, and other, network devices are also connected. Each virtual device container module implements the functionality to communicate with a respective legacy network device over the network, and to perform additional functions on behalf of the legacy network device.

As described in the aforementioned application, the virtual device container modules operate in conjunction with functional specific application modules that perform the desired enterprise applications, such as an enterprise e-mail application. The aforementioned architecture supports the inter-communication between the functional specific application modules and the virtual device container modules through the use of a dedicated software bus. The dedicated software bus is designed to support the aforementioned architecture and its associated inter-communications. Specifically, the software bus utilizes certain commands and protocols to support communication between the various modules of the aforementioned object-based architecture. In this manner, the virtual device container modules, functional specific application modules and the software bus operate in a coordinated fashion to virtually extend the capabilities of legacy network devices on the network.

The above-described object-based architecture implements enterprise applications through the functional specific application modules which have appropriate interfaces to enable them to communicate with the virtual device container modules via the software bus. Accordingly, it can be appreciated that the functional specific application modules are designed and implemented with specific knowledge regarding the communication commands and protocols for communicating with the virtual device container modules, and other modules, via the software bus. It can further be appreciated that it is desirable for third-party applications, such as those created without specific knowledge of the above-described object-based architecture, to utilize the object-based architecture for obtaining information from, sending settings to, and sending function commands to, the various legacy network devices.

For example, it is desirable for a third-party network management application to have the ability to interface with the above-described object-based architecture without requiring the third-party application to have specific knowledge of the various interfaces between the virtual device container modules and the software bus. Accordingly, a simple mechanism is needed to provide a third-party application with the ability to receive information from, and send information and commands to, legacy network devices which are supported by the above-described object-based architecture.

SUMMARY OF THE INVENTION

The present invention addresses the foregoing problems by providing a simple and efficient interface for use by a third-party application to communicate indirectly with virtual device container modules which are used to extend the capabilities of network devices. In this manner, a third-party application can obtain information from the virtual device container modules, send settings to the virtual device container modules, and command the virtual device container modules to perform certain functional operations through the interface by using a simple set of basic, predefined commands.

Accordingly, one aspect of the invention concerns interfacing a plurality of virtual device container modules to a third-party application, each of the virtual device container modules being in communication with a tracker module through a software bus. The invention includes receiving an interface command at the interface module from the third-party application via a third-party connection, the interface command relating to a designated one of the plurality of virtual device container modules, and establishing a direct connection between the interface module and the designated virtual device container module by using an address pointer. The invention further includes receiving information data, at the interface module, from the designated virtual device container module via the direct connection, the information data relating to the designated virtual device container module, and sending the information data from the interface module to the third-party application via the third-party connection.

Preferably, the direct connection is a COM interface. In addition, the third-party connection preferably supports a set of predefined commands which are basic in nature and do not require specific knowledge of the tracker module or the software bus. Also, the address pointer is preferably received by the interface module from the tracker module in response to an address request for the designated virtual device container module. The information data preferably is received in response to an information request sent from the interface module to the designated virtual device container module via the direct connection.

By virtue of the foregoing, an interface is provided for use by a third-party application to communicate indirectly with virtual device container modules which are used to extend the capabilities of network devices. In this manner, a third-party application can obtain information from the virtual device container modules, send settings to the virtual device container modules, and command the virtual device container modules to perform certain functional operations through the interface by using a simple set of basic, predefined commands. The third-party application can therefore monitor and manage virtual device container modules without having direct knowledge of the interfaces between the virtual device container modules, the tracker module and the software bus.

According to another aspect, the invention concerns interfacing a plurality of virtual device container modules to a third-party application, each of the virtual device container modules being in communication with a tracker module through a software bus. The invention includes receiving an interface command at the interface module from the third-party application via a third-party connection, the interface command relating to a designated one of the plurality of virtual device container modules, sending an address request from the interface module to the tracker module via an intermediate connection, the address request relating to the designated virtual device container module, and receiving, at the interface module, an address pointer from the tracker module via the intermediate connection, the address pointer relating to the designated virtual device container module. The invention further includes establishing a direct connection between the interface module and the designated virtual device container module by using the address pointer, sending an information request from the interface module to the designated device container module via the direct connection, receiving information data, at the interface module, from the designated virtual device container module via the direct connection, the information data relating to the designated virtual device container module, and sending the information data from the interface module to the third-party application via the third-party connection.

Preferably, the direct connection is a COM interface. In addition, the third-party connection preferably supports a set of predefined commands which are basic in nature and do not require specific knowledge of the interfaces between the tracker module, the virtual device container modules and the software bus. Each virtual device container module preferably corresponds to at least one network device. The set of predefined commands preferably includes a discovery request to obtain information regarding all virtual device container modules, and a status request to obtain specific status information of a designated virtual device container module. Also, the third-party application preferably initiates execution of the interface module.

By virtue of the foregoing, an interface is provided for use by a third-party application to communicate indirectly with virtual device container modules which are used to extend the capabilities of network devices. In this manner, a third-party application can obtain information from the virtual device container modules, send settings to the virtual device container modules, and command the virtual device container modules to perform certain functional operations through the interface by using a simple set of basic, predefined commands. The third-party application can therefore monitor and manage network devices through the virtual device container modules without having direct knowledge of the interfaces between the virtual device container modules, the tracker module and the software bus.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIGS. 10 to 15 are views for explaining contents of commands shown in FIG. 9, in which FIG. 10 shows ID_INFO, FIG. 11 shows STATUS_INFO, FIG. 12 shows TRAY_INFO, FIG. 13 shows SETTING_TOKENS, FIG. 14 shows CONTROL_TOKENS, and FIG. 15 shows ERROR_IND indicators.

FIG. 17 is a view for describing another embodiment of the invention in which the interface module is in communication with more than one type of tracking module.

DETAILED DESCRIPTION OF THE PREFERRED EMBODIMENTS

The present invention is preferably practiced in an open, object-oriented architecture which virtually extends the functionality of network devices on a network, particularly legacy network devices. Such an object-oriented architecture is described in the above-referenced U.S. patent application Ser. No. 09/664,531, entitled "Object-Based Architecture For Supporting Network Devices." The aforementioned application describes an object-based architecture which is used to virtually extend the capabilities of network devices. As described in the aforementioned application, the architecture includes virtual device container modules which are executed on a computing device connected to a network on which legacy, and other, network devices are also connected. Each such virtual device container module implements the functionality to communicate with a respective legacy network device over the network, and to perform additional functions on behalf of the legacy network device.

The virtual device containers described above are used to virtually represent additional functionality for a given network device, as if the additional functionality were embedded in the network device. In this manner, a legacy device can be made to appear to other devices on the network as if the legacy device has the embedded functionality to support enterprise-wide applications which the legacy device could not otherwise support. Such enterprise-wide applications can include e-mail printing, security applications, network management applications, job tracking applications, resource management applications, and the like. This transparent virtual extension of a legacy device's functionality is implemented through the aforementioned software architecture of object-based modules so that new functions can be added for existing, and new, network devices in a simple and efficient manner.

The present invention provides a simple, efficient interface between third-party applications and the aforementioned object-based architecture, so that third-party applications can obtain data from, and send data to, the virtual device containers and their corresponding network devices without having to be directly involved in the aforementioned object-based architecture. Accordingly, third-party applications that have no ability to directly interact with the aforementioned object-based architecture can effectively interface with the virtual device containers in the object-based architecture through an interface module using a predefined set of simple commands.

Figure 1:
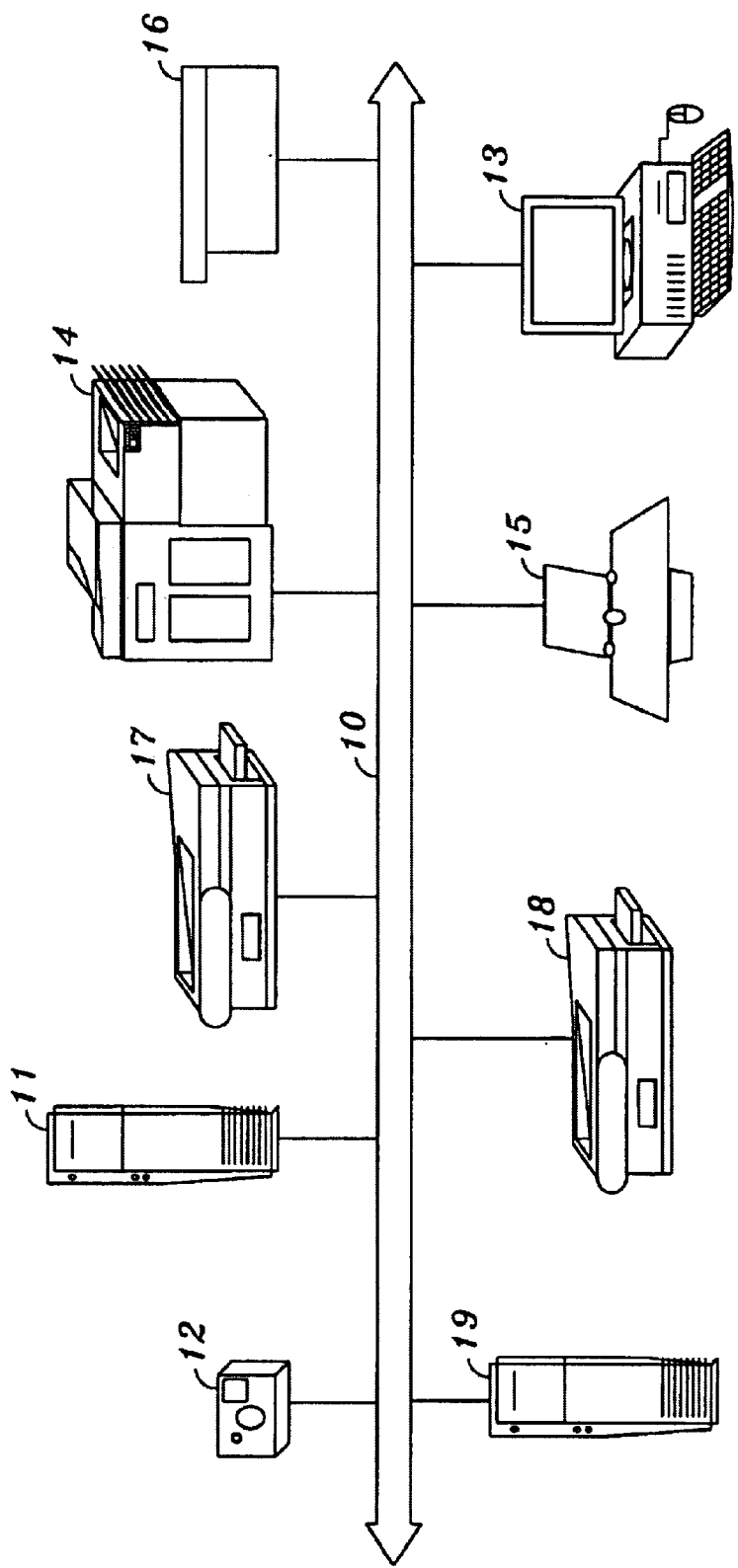
FIG. 1 is a block diagram for illustrating a network environment in which the present invention may be practiced.

FIG. 1 depicts a network environment in which the invention may be practiced. As seen in FIG. 1, network 10 includes servers 11 and 19, computer 13, and several network devices including digital camera 12, digital copier 14, digital scanner 16, and digital printers 15, 17 and 18. Network 10 may be a local area network (LAN), a wide area network (WAN), or any other type of network which supports TCP/IP, and other protocols discussed below. In the network environment of FIG. 1, server 11 is used to implement the object-based architecture of the present invention, although the architecture can also operate across several computing platforms, such as server 19, in a distributed manner. The function of server 11 will be explained more fully below. Server 19 is similar to server 11 and can also be used to implement the present invention as explained herein. Computer 13 is a typical personal computer for executing third-party applications, such as a network management tool, thereby allowing a user, such as a system administrator, to manage the network configuration of network devices on network 10 from computer 13. Accordingly, computer 13 also has a network management application as discussed more fully below.

As discussed above, each of digital camera 12, digital copier 14, digital scanner 16, and printers 15, 17 and 18 have different levels of network functionality. For example, network printer 15 may have the functional ability to support e-mail printing, while printers 17 and 18 do not. In this manner, network 10 is a heterogeneous environment of network devices having mixed levels of network-application functional capabilities.

Figure 2:
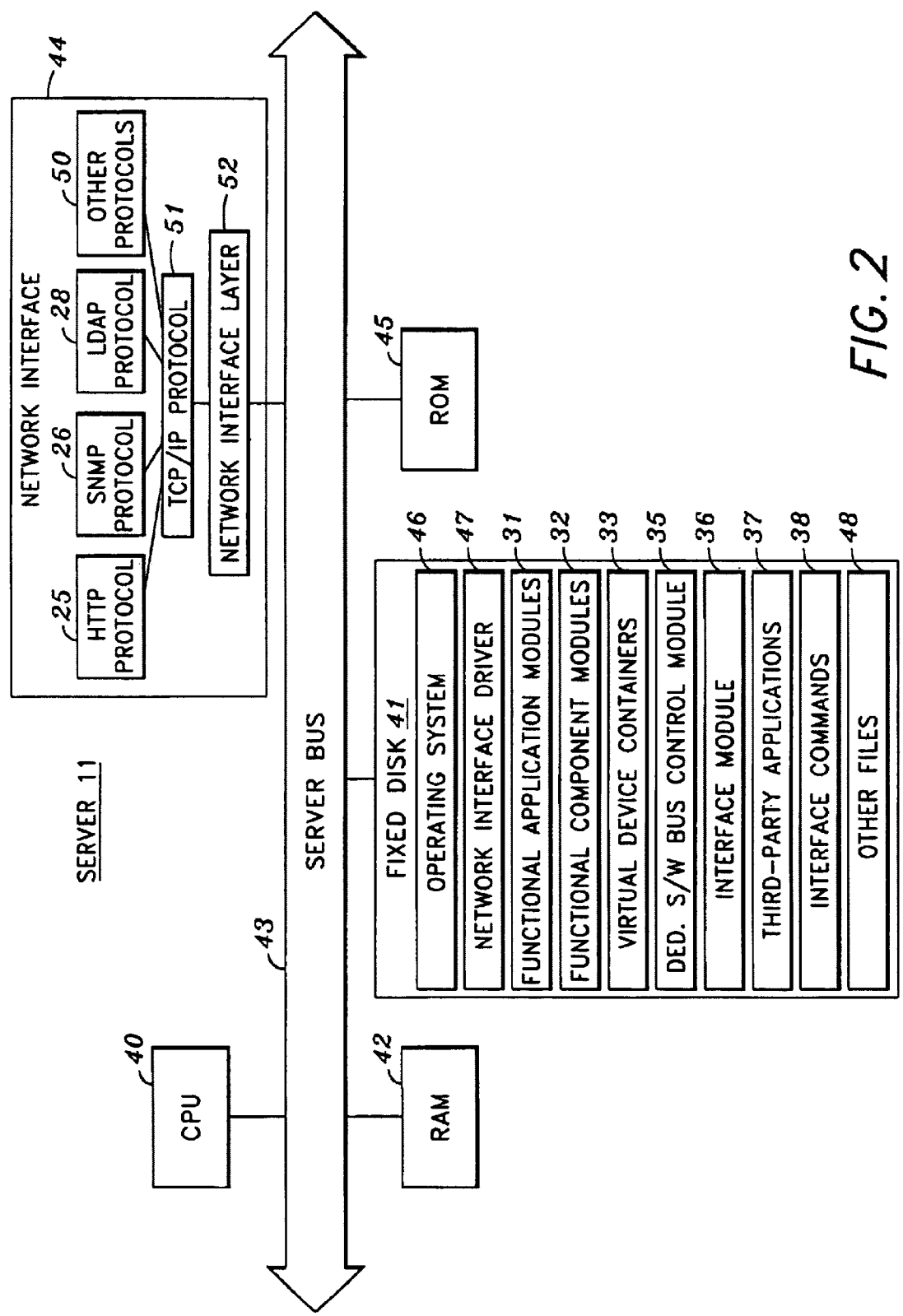
FIG. 2 is a block diagram for explaining the internal architecture of a server according to one embodiment of the present invention.

FIG. 2 is a block diagram for explaining the internal architecture of server 11. In FIG. 2, server 11 is seen to include a central processing unit ("CPU") 40 such as a programmable microprocessor which is interfaced to server bus 43. Also coupled to server bus 43 is a network interface 44 for interfacing to network 10. In addition, random access memory ("RAM") 42, fixed disk 41, and read-only memory ("ROM") 45 are also coupled to server bus 43. RAM 42 interfaces to server bus 43 to provide CPU 40 with access to memory storage, thereby acting as the main run-time memory for CPU 40. In particular, when executing stored program instruction sequences, CPU 40 loads those instruction sequences from fixed disk 41 (or other memory media) into RAM 42 and executes those stored program instruction sequences out of RAM 42. It should also be recognized that standard disk-swapping techniques allow segments of memory to be swapped to and from RAM 42 and fixed disk 41.

ROM 42 stores invariant instruction sequences, such as start-up instruction sequences for CPU 40 or basic input/output operating system ("BIOS") sequences for the operation of peripheral devices which may be attached to server 11 (not shown). Network interface 44 contains several modules to provide the appropriate interface functionality for server 11 according to the present invention. In particular, network interface 44 contains network interface layer 52 which is a low-level protocol layer to interface with network 10. TCP/IP layer 51 is provided above network interface layer 52 for communicating over network 10 via TCP/IP, a standard network protocol. Other protocols 50 are also provided to allow server 11 to communicate over network 10 using other conventional protocols. HTTP protocol 25, SNMP protocol 26, and LDAP protocol 28 are also provided in network interface 44 for allowing server 11 to communicate over network 10 using HTTP, SNMP and LDAP, respectively.

Fixed disk 41 is one example of a computer-readable medium that stores program instruction sequences executable by CPU 40 so as to constitute operating system 45, network interface driver 47, functional application modules (FAMs) 31, functional component modules (FCMs) 32, virtual device containers (VDC) 33, dedicated software bus (DSB) control module 35, interface module 36, third-party applications 37, interface commands 38 and other files 48.

As mentioned above, operating system 46 can be an operating system such as DOS, Windows 95, Windows 98, Windows 2000, Windows NT, UNIX, or other such operating system. Network interface driver 47 is utilized to drive network interface 44 for interfacing server 11 to network 10. FAMs 31, FCMs 32, VDCs 33 and DSB control module 35 are utilized to implement the object-based architecture environment in which the invention is practiced, as described more fully below.

Figure 3:
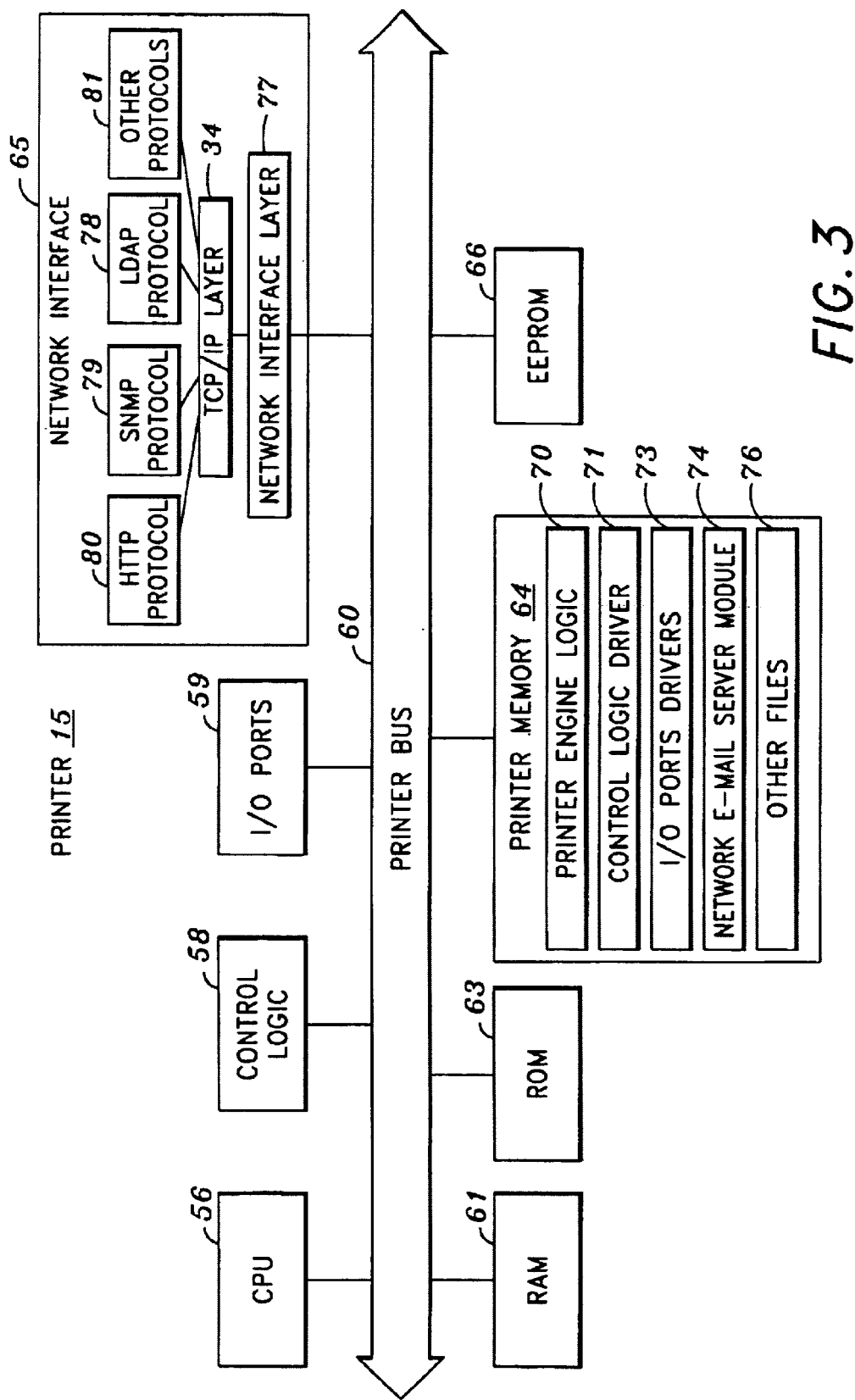
FIG. 3 is a block diagram for explaining the internal architecture of a printer according to one embodiment of the present invention.

Interface module 36 is used to implement the present invention by providing a communication bridge between third-party applications 37 and the virtual device containers of the aforementioned object-based architecture. In this regard, third-party applications 37 are network applications, such as a network management application, that are developed by a third-party and that are not designed and implemented to be capable of direct communication with the components of the aforementioned object-based architecture. Third-party applications 37 may include a third-party network management application, a third-party e-mail printing application, a third-party network security application, a third-party resource management application, and a third-party print job accounting application. A third-party network management application may be comprised of a knowledge module which is used to maintain information about many network devices, wherein the knowledge module includes a plurality of sub-knowledge modules, each of which maintains information related to a particular type of network device. Each sub-knowledge modules in turn includes a plurality of device-modules, each of which maintains information related to a particular network device. Interface commands 38 are utilized to allow third-party applications 37 to communicate with interface module 36 in order to obtain data from and/or send data to the virtual device containers of the object-based architecture. Lastly, other files 48 contains other files or programs necessary to operate server 11 and/or to provide additional functionality to server FIG. 3 is a block diagram showing an overview of the internal architecture of network printer 15. In FIG. 3, network printer 15 is seen to contain a central processing unit ("CPU") 55 such as a programmable microprocessor which is interfaced to printer bus 60. Also coupled to printer bus 60 are control logic 58, which is utilized to control the printer engine of network printer 15 (not shown), I/O ports 59 which is used to communicate with various input/output devices of network printer 15 (not shown), and network interface 65 which is utilized to interface network printer 15 to network 10. Network interface 65 contains several modules to provide the appropriate interface functionality for network printer 15 according to the present invention.

In particular, network interface 65 contains network interface layer 77 which is a low-level protocol layer to interface with network 10. TCP/IP layer 34 is provided above network interface layer 77 for communicating over network 10 via TCP/IP, a standard network protocol. In the next layer of network interface 44, HTTP protocol 80, SNMP protocol 79 and LDAP protocol 78 are provided for allowing network printer 15 to communicate over network 10 using HTTP, SNMP and LDAP protocols. Other protocols 81 are also provided to allow network printer 15 to communicate over network 10 using other conventional protocols.

Also coupled to printer bus 60 are EEPROM 66, for containing nonvolatile program instructions, random access memory ("RAM") 61, printer memory 64 and read-only memory ("ROM") 63. RAM 61 interfaces to printer bus 60 to provide CPU 55 with access to memory storage, thereby acting as the main run-time memory for CPU 55. In particular, when executing stored program instruction sequences, CPU 55 loads those instruction sequences from printer memory 64 (or other memory media) into RAM 61 and executes those stored program instruction sequences out of RAM 61. ROM 63 stores invariant instruction sequences, such as start-up instruction sequences for CPU 55 or BIOS sequences for the operation of various peripheral devices of network printer 15 (not shown).

Printer memory 64 is one example of a computer-readable medium that stores program instruction sequences executable by CPU 55 so as to constitute printer engine logic 70, control logic driver 71, I/O port drivers 73, network e-mail server module 74, and other files 76. Printer engine logic 70 and control logic driver 71 are utilized to control and drive the printer engine of network printer 15 (not shown) so as to print an image according to image data received by network printer 15, preferably over network 10. I/O port drivers 73 are utilized to drive the input and output devices (not shown) connected through I/O ports 59. Network e-mail server module 74 is provided to support a network e-mail application for e-mail printing capability, and the like. Finally, other files 76 are used to provide other information and programs necessary for the operation and functionality of network printer 15.

Figure 4:
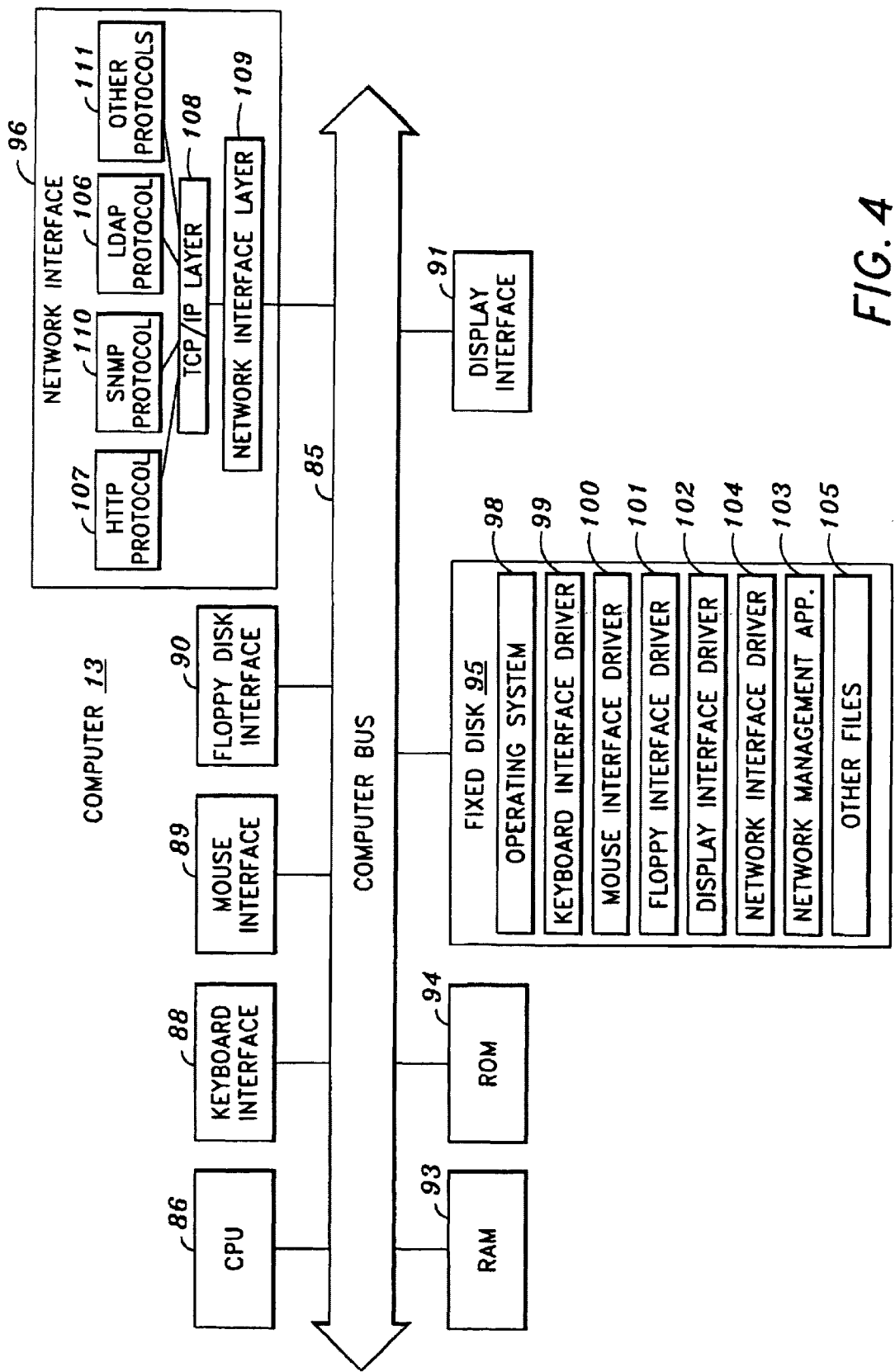
FIG. 4 is a block diagram for explaining the internal architecture of a computer according to one embodiment of the present invention.

FIG. 4 is a block diagram showing an overview of the internal architecture of computer 13. As discussed above, computer 13 is used in the network environment of FIG. 1 to implement third-party network applications, such as a network management application, so that a network user, such as a network administrator, may access, view and modify the network settings of the devices on network 10. In FIG. 4, desktop computer 13 is seen to include central processing unit (CPU) 86 such as a programmable microprocessor which is interfaced to computer bus 85. Also coupled to computer bus 85 are keyboard interface 88 for interfacing to a keyboard, mouse interface 89 for interfacing to a pointing device, such as a mouse, floppy disk interface 90 for interfacing to a floppy disk, display interface 91 for interfacing to a display, and network interface 96 for interfacing to network 10. Network interface 96 contains several modules to provide the appropriate interface functionality for computer 13 according to the present invention.

In particular, network interface 96 contains network interface layer 109 which is a low-level protocol layer to interface with network 10. TCP/IP layer 108 is provided above network interface layer 109 for communicating over network 10 via TCP/IP, a standard network protocol. Other protocols 111 are also provided to allow computer 13 to communicate over network 10 using other conventional protocols. HTTP protocol 107, SNMP protocol 110 and LDAP protocol 106 are also provided in network interface 96 for allowing computer 13 to communicate over network 10 via HTTP, SNMP and LDAP protocols.

Random access memory ("RAM") 93 interfaces to computer bus 85 to provide central processing unit ("CPU") 86 with access to memory storage, thereby acting as the main run-time memory for CPU 86. In particular, when executing stored program instruction sequences, CPU 86 loads those instruction sequences from fixed disk 95 (or other memory media) into random access memory ("RAM") 93 and executes those stored program instruction sequences out of RAM 93. It should also be noted that standard-disk swapping techniques available under windowing operating systems allow segments of memory to be swapped to and from RAM 93 and fixed disk 95. Read-only memory ("ROM") 94 stores invariant instruction sequences, such as start-up instruction sequences for CPU 86 or basic input/output operation system ("BIOS") sequences for the operation of peripheral devices attached to computer 13.

Fixed disk 95 is one example of a computer-readable medium that stores program instruction sequences executable by central processing unit ("CPU") 86 so as to constitute operating system 98, keyboard interface driver 99 for driving keyboard interface 88, mouse interface driver 100 for driving mouse interface 89, floppy disk interface driver 101 for driving floppy disk interface 90, display interface driver 102 for driving display interface 91, network interface driver 104 for driving network interface 96, network management application 103, and other files 105. As mentioned above, operating system 98 is preferably a windowing operating system, such as Windows 2000, Windows 98, Windows 95, and Windows NT, although other types of operating systems such as DOS, UNIX and LINUX may be used with the present invention. Network management application 103 is an application for execution in CPU 86 to allow a user of computer 13 to access, view and modify network settings of the network devices on network 10. For example, network management application 103 may operate in conjunction with one of functional application modules 31 which acts as a network management proxy to exchange data between network devices on network 10 and network management application 103.

The architecture of the present invention provides functional support for such network applications on behalf of those network devices that do not have the embedded capability to provide such support. Other files 105 contain other information and programs necessary for computer 13 to operate and to add additional functionality to computer 13.

Figures 5A, 5B, 5C:
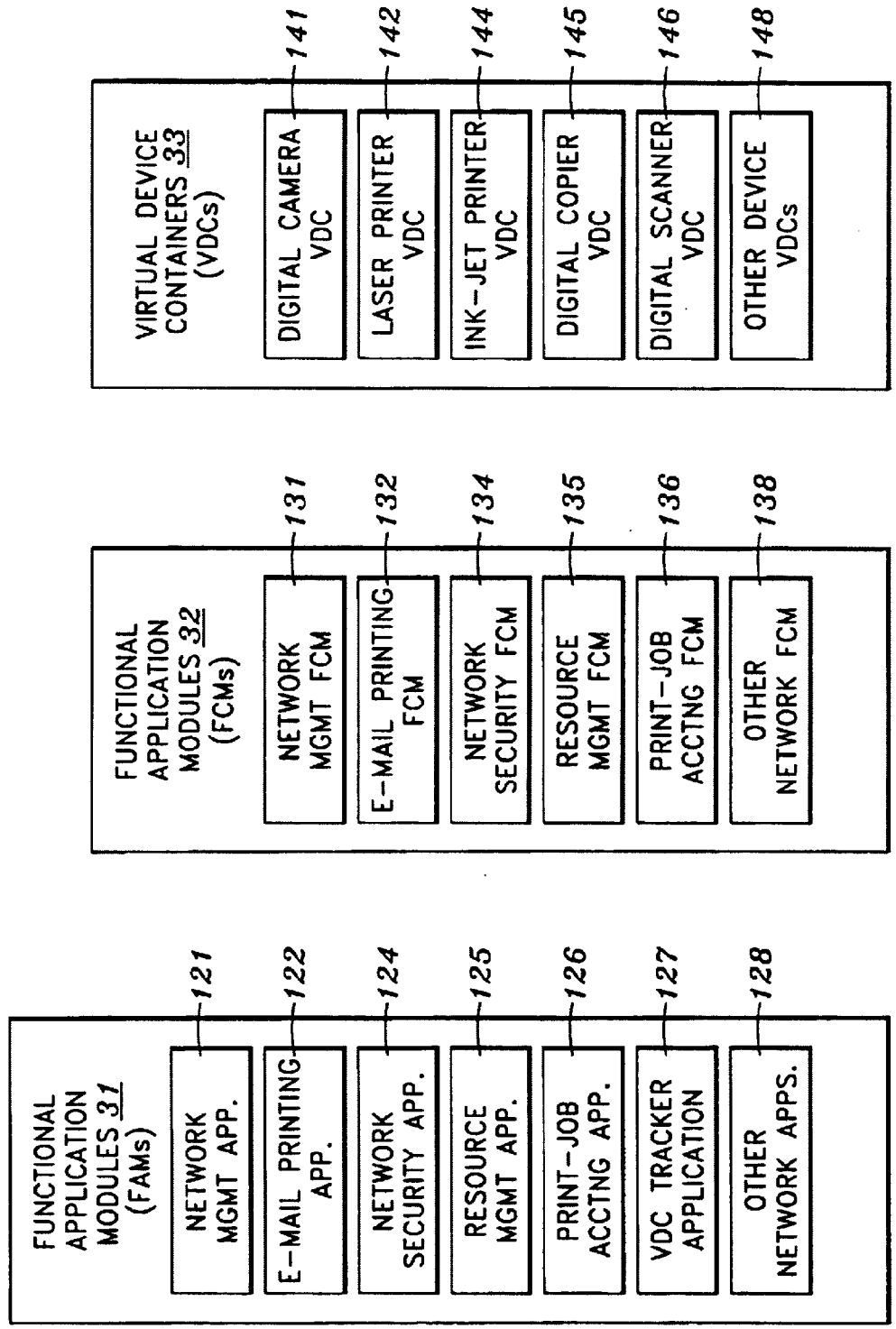
FIGS. 5A, 5B and 5C are detailed block diagrams for explaining functional application modules, functional component modules and virtual device containers according to one embodiment of the present invention.

FIGS. 5A, 5B and 5C provide detailed descriptions of functional application modules (FAMs) 31, functional component modules (FCMs) 32 and virtual device containers (VDCs) 33. As seen in FIG. 5A, FCMs 31 contain different network-based applications which rely upon data and/or functionality from various network devices on network 10, or which control the various network devices on network 10 in some fashion. FAMs 31 include network management application 121, e-mail printing application 122, network security application 124, resource management application 125, print job accounting application 126, VDC tracker application 127 and other network applications 128. Network management application 121 is a network-based application which is executed in server 11 to provide functionality for managing various network devices on network 10. For example, a user, such as a network administrator, may utilize network management application 103 on computer 13 to access the functional capabilities provided by network management application 121 in server 11, thereby allowing the user to reconfigure network settings of one or more of the network devices on network 10, such as network printer 15.

E-mail printing application 122 provides the functional capability for users, such as a user of computer 13, to send a print job via e-mail printing application 122 to a printer, such as printer 17 or digital copier 14, for printing. Network security application 124 provides network-wide functional capability to ensure secure transmission of data between network devices on network 10 and to prevent undesired access to any one of the network devices. Resource management application 125 provides network-wide functional capability to manage resources, such as printers 15, 17 and 18, so that they are utilized in the most efficient manner to accomplish the tasks submitted by users of network 10. Print job accounting application 126 provides network-wide capability to monitor and track print jobs to each of the printing devices on network 10, such as printers 15, 17 and 18, and digital copier 14. In this manner, print job accounting application 126 can summarize printer usage for accounting and cost analysis purposes. VDC tracker application 127 has the ability to discover all VDCs present within the object-based architecture and to track information regarding each VDC, such as an address location of the VDC and other information related to the VDC. VDC tracker application 127 is an integral part of the present invention and is used to provide interface module 36 with the ability to communicate directly with a particular VDC, as described more fully below. Other network applications 128 provides other network-based application capability through server 11 to the users of network 10.

Turning to FIG. 5B, it can be seen that corresponding FCMs 32 exist for each of respective FAMs 31 in FIG. 5A. Accordingly, FCMs 32 include network management FCM 131, e-mail printing FCM 132, network security FCM 134, resource management FCM 135, print job accounting FCM 136 and other network FCMs 138. Each of the foregoing FCMs is used to provide support on behalf of a given network device, such as network printer 15, for each of the corresponding FAMs 31 of FIG. 5A. In this manner, an FCM, such as network management FCM 131, can be executed in server 11 to provide support to network management application 121 on behalf of a network device, such as network printer 15. In this manner, users of network management application 121 are provided with the external appearance that network printer 15 has embedded support for network management application 121. It can be appreciated that network management FCM 131 acts as a kind of embedded-function proxy for the network device to which it corresponds. Accordingly, a legacy device such, as network printer 15, which does not have embedded support for a particular network-based application can virtually extend its functionality through a set of modularized software components. The software components are executed in a server on the same network that the legacy network device resides, thereby providing the needed software functionality on behalf of the legacy network device as if such functionality were embedded in the legacy network device.

Therefore, selected ones of FAMs 31 and FCMs 32 can be implemented in a server in order to accommodate the needs of the particular legacy devices on the network to implement the desired network-based applications across the network. The manner in which FAMs 31 and FCMs 32 are implemented and interfaced to provide such support is discussed in more detail below.

Turning to FIG. 5C, virtual device containers 33 are seen to include digital camera VDC 141, laser printer VDC 142, ink jet printer VDC 144, digital copier VDC 145, digital scanner VDC 146, and other device VDCs 148. As discussed above, FCMs 32 are utilized to virtually expand the functional capabilities of a given network device which does not have the desired functionality embedded therein. Accordingly, it can be appreciated that the specific selection of FCMs 32 to provide the necessary functional extensions for a given network device, such as network printer 15, depends on the functional capability that is already embedded in network printer 15, and also depends on the FAMs 31 that the network device needs to support.

For example, network printer 15 already has embedded capability for e-mail printing by means of network e-mail server module 74 in printer memory 64. Accordingly, network printer 15 does not need to have a functional extension in order to support e-mail printing application 122. However, network printer 15 is not seen to have embedded support for any of the other FAMs 31 shown in FIG. 5A. Accordingly, it is desirable to implement network management FCM 131, network security FCM 134, resource management FCM 135, and print job accounting FCM 136 to provide functional support on behalf of network printer 15 to corresponding FAMs 121, 124, 125 and 126. It can be appreciated, therefore, that different combinations of functional component modules 32 will be desired for each particular network device on network 10 in order to provide all such network devices with full capability to support all of the functional application modules 31, depending on the different levels of functionality already embedded in each of the network devices.

In view of the above, a mechanism is necessary to coordinate the desired collection of FCMs 32 corresponding to each network device on network 10. Each of virtual device containers 33 provide this mechanism by acting as a virtual container to contain the necessary extended functional support for a given network device. Each VDC presents a virtual device to external entities on the network with an appearance of the same level of functionality and consistent external interface, regardless of the level of functional support that is embedded in the actual device. Accordingly, the functional capabilities of an existing network device can be virtually extended without changing the hardware of the network device.

To accomplish this, each VDC contains the necessary set of FCMs 32, when used in combination with the already embedded functionality of the corresponding network device, and can support the FCMs which are implemented in a server on the same network as the network device. It can therefore be appreciated that the VDC's main purpose is to provide a container in which the necessary FCMs execute. In particular, the VDC is responsible for loading each of the FCMs necessary for the corresponding network device, and for providing an external interface for network users of the VDC to find and to interoperate with the FCMs contained within that particular VDC. In this regard, a separate VDC is implemented and dedicated for each particular network device on network 10 that needs its functional capabilities virtually extended through the use of a set of FCMs 32.

Accordingly, digital camera VDC 141 is provided to contain the necessary FCMs 32 in order to make up for the functional deficiencies of digital camera 12 for supporting FAMs 41. In a similar manner, laser printer VDC 142, ink jet printer VDC 144, digital copier VDC 145, and digital scanner VDC 146 provide virtually extended functional support on behalf of laser printers 17 and 18, network printer 15, digital copier 14, and digital scanner, respectively. The manner in which virtual device containers 33 are implemented in server 11 and interfaced with other components of the object-based architecture of the present invention is described in more detail below.

Figure 6:
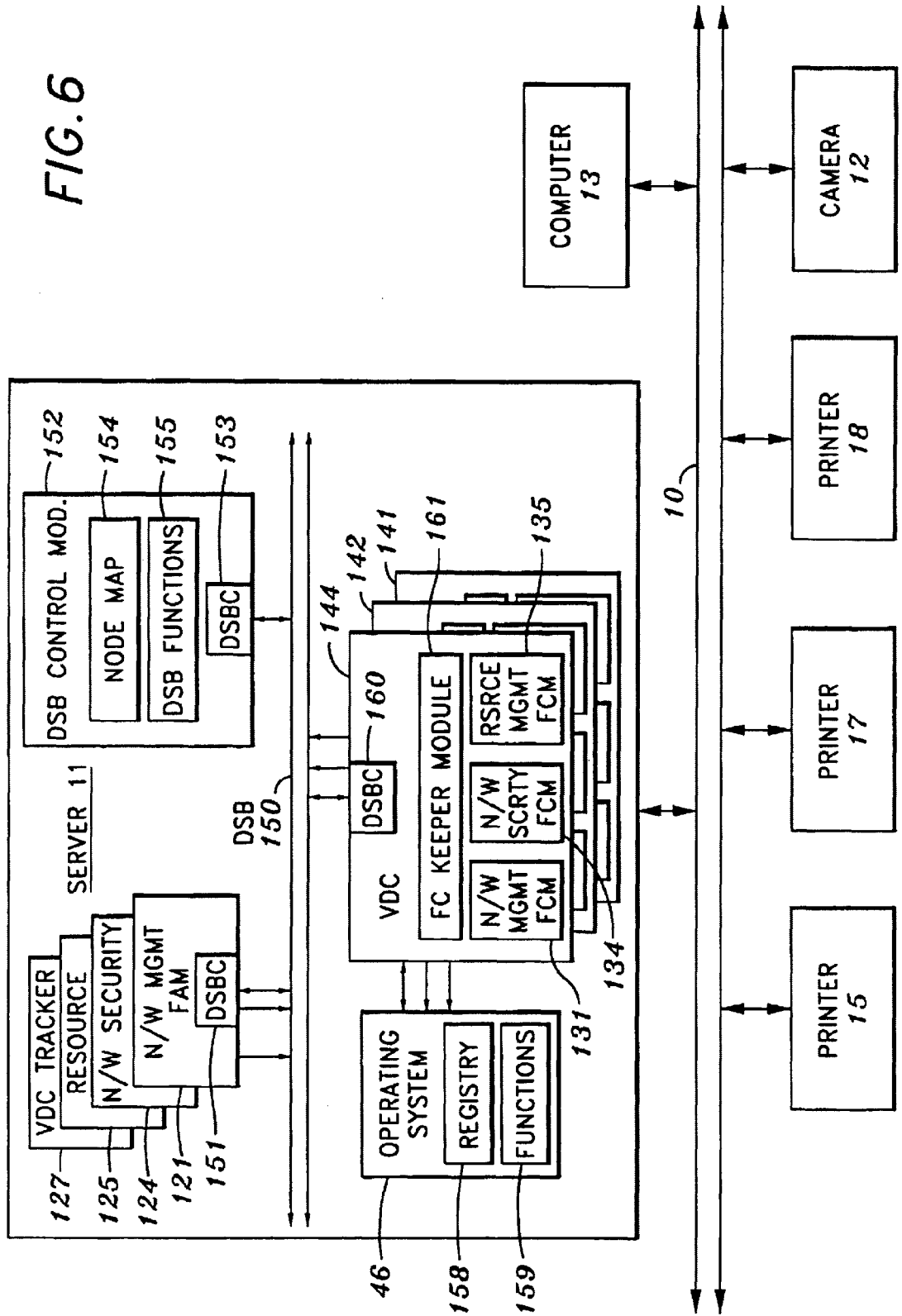
FIG. 6 is a functional block diagram for explaining an object-based architecture according to one embodiment of the present invention.

FIG. 6 provides a functional block diagram for illustrating the object-based architecture of the present invention for implementing virtual device containers 33 to virtually extend the functional capabilities of various network devices on network 10. In particular, it can be seen that server 11, printers 15, 17 and 18, digital camera 12, and computer 13 reside on network 10, as depicted in FIG. 1. In this embodiment of the present invention, virtual device containers 141, 142 and 144 are maintained and executed in server 11 in order to provide virtual functional capability for digital camera 12, laser printer 17, and network printer 15, respectively. As seen in FIG. 6, each of VDCs 141, 142 and 144 communicates via a dedicated software bus (DSB) 150 in order to communicate with other components of the illustrated architecture.

In particular, and for purposes of explaining FIG. 6, it is presumed that only network management FAM 121, network security FAM 124, resource management FAM 125, and VDC tracker FAM 127 are desired to be implemented on network 10. Of course, any other combination of FAMs 31 can be implemented on network 10. Accordingly, network management, network security, resource management and VDC tracking functions are supported by server 11 over network 10 on a network-wide basis. Accordingly, each of VDCs 141, 142 and 144 contains selected ones of FCMs 32 to provide the necessary virtual extension of functional capabilities for their respective network devices to support FAMs 121, 124 and 125. For example, if network management FAM 121 is being executed and needs information from network printer 15, network management FAM 121 establishes communication with VDC 144 which virtually represents the network management functional support capability for network printer 15 through network management FCM 131. Accordingly, each functional application module needs to find the appropriate virtual device container which corresponds to the actual network device with which the FAM needs to communicate for data exchange and functional support purposes. VDC tracker FAM 127 is not supported by any particular VDC, but is instead used to discover and track all VDC's present in the object-based architecture. Accordingly, the information maintained by VDC tracker FAM 127 is accessed by interface module 36 in order to establish a direct line of communication between interface module 36 and one of VDCs 33. The functionality of VDC tracker FAM 127 is explained more fully below.

Dedicated software bus (DSB) 150 is provided in order to assist FAMs 31, such as network management FAM 121, in finding the appropriate VDC corresponding to a particular network device, such as VDC 144. This allows FAMs 31 to access the corresponding FCM within the VDC so as to obtain the needed functional support on behalf of the network device. In this manner, dedicated software bus 150 provides a virtual bus through a set of APIs (application program interfaces) in order to assist the various nodes on DSB 150 to find each other and to communicate with each other to exchange data and/or commands. A node is defined as any entity which connects to and utilizes DSB 150. For example, each of functional application modules 121, 124 and 125 and each of VDCs 141, 142 and 144 are considered to be separate nodes on DSB 150. DSB 150 is implemented by tracking the presence of each node on DSB 150, facilitating protocol handshaking between the various nodes, and supporting communication between the various nodes. Each node entity connects to DSB 150 through a dedicated software bus connector (DSBC) module which is an in-process software module that is executed by the particular node entity, such as a FAM or FCM.

Each dedicated software bus connector (DSBC) provides a set of APIs for its host entity to utilize in order to communicate via DSB 150. It can be seen in FIG. 6 that network management FAM 121 has DSBC 151, VDC 144 has DSBC 160, and DSB control module 162 has DSBC 153. DSB 150 is implemented, controlled and managed through DSB control module 162. In general, DSB control module 162 serves the purpose of maintaining node map 164 which collects information from each node on DSB 150 that is detected by DSB control module 152. Such information includes, but is not limited to, a description of each entity connected as a node on DSB 150 along with the corresponding node address of each node. For example, each of FAMs 121, 124 and 125 and each of VDCs 141, 142 and 144 are registered as DSB nodes in node map 154.

DSB functions 155 handles each of the functions of DSB 150 which are implemented and controlled by DSB control module 152. In general, communication over DSB 150 is performed by utilizing a plurality of predefined software bus messages (APIs) that are controlled by DSB control module 152, which acts as the arbiter for all software bus messages. These software bus messages are unique to DSB 150 and provide the communication services for the object-based architecture. For example, the software bus messages include a discovery request which is used by a node on DSB 150 to obtain information regarding each node on DSB 150 that has been detected by DSB control module 152 and that has corresponding information in node map 154. Preferably, DSB 150 contains a data channel and a command channel, so as to facilitate the transfer of data over DSB 150 without interference with command-type communications over DSB 150. The transfer of the software bus messages may be conducted in any one of a plurality of different protocols. The above-referenced U.S. patent application Ser. No. 09/664,531 provides a more detailed explanation of the functionality of DSB 150 and DSB control module 152, along with node map 154 and DSB functions 155.

As can be seen in FIG. 6, each of VDCs 141, 142 and 144 contains several modules in order to provide the extended functional capabilities required for the network device corresponding to the VDC. For example, VDC 144 corresponds to network printer 15 and includes FCMs 131, 134 and 135 for supporting network management, network security, and resource management capabilities, respectively, of corresponding FAMs 121, 124 and 125 on behalf of network printer 15. Functional component keeper module 161 is provided in VDC 144 in order to load and start each of network management FCM 131, network security FCM 134, and resource management FCM 135 at initialization of VDC 144, such as at power-up of server 11 or in response to a reset command. In particular, FC keeper module 161 reads operating system registry 168 in order to determine which ones of FCMs 32 should be loaded into VDC 144 in order to provide the desired extended functional capabilities on behalf of network printer 15. As previously mentioned, VDC 144 includes DSBC 160 in order to allow VDC 144 to communicate with other entities via DSB 150. In particular, DSBC 160 assists an external entity, such as network management FAM 121, to access and utilize the appropriate one of FCMs 131, 134 and 135 in VDC 144, such as network management FCM 131.

Virtual device containers 141, 142 and 144 therefore provide a virtual representation of digital camera 12, laser printer 17 and network printer 15 to functional application modules 121, 124 and 125, as if digital camera 12, network printer 15 and laser printer 17 contained embedded functional capability to support the aforementioned application modules. Accordingly, it can be appreciated that each functional application module, such as network FAM 121, has a one-too-many relationship with a plurality of VDCs in order to carry out the functionality of the particular FAM, such as network management capabilities.

In this regard, the corresponding FCM in each VDC has the same external interface to the FAM so that the FAM can communicate and interact with each FCM in each of the VDCs in the same consistent and uniform manner. For example, each of VDCs 141, 142 and 144 contains a separate instance of network management FCM 131 in order to allow each VDC to functionally support network management FAM 121. Accordingly, network management FAM 121 and network management FCM 131 have corresponding external interfaces to support communication and functionality between network management FAM 121 and network management FCM 131, regardless of which VDC network management FCM 131 resides in. Therefore, it can be appreciated that functional component modules 32 provide uniform functional building blocks for supporting corresponding functional application modules 31. In addition, VDCs 33 provide virtual containers in which to place selected instances of functional component modules 32 that are necessary to extend the functional capabilities of corresponding network devices to support those functional application modules 31 which have been selected and implemented on network 10. In this manner, the object-based architecture of the present invention is implemented via modular components in order to provide flexibility, depending on the types of network devices that are on a given network and depending on the types of functional, network-wide applications that are desired on the network.

Each FCM that is loaded into a VDC provides the VDC with an interface pointer that can be used to access the particular FCM. In the embodiment depicted in FIG. 6, network management FCM 131, network security FCM 134 and resource management FCM 135 are each queried by FC keeper module 161 after being loaded to return a common interface pointer. Each of the aforementioned FCMs returns its respective common interface pointer to FC keeper module 161 which in turn gives the pointers to VDC 144 in order to allow VDC 144 to subsequently access each of the aforementioned FCMs. In addition, the common interface pointers are used by VDC 144 to allow external entities, such as network management FAM 121, to access the FCMs in VDC 144. Each VDC also utilizes a set of APIs in order to communicate with each of the FCMs in the VDC. For example, VDC 144 utilizes a set of APIs to control each of FCMs 131, 134 and 135. Such APIs may be used by VDC 144 in order to direct one of the FCMs, such as network management FCM 131, to start up, shut down, pause, resume, reset and pass messages. In this manner, each VDC provides control over the operation of the FCMs contained in that particular VDC.

As discussed above, DSBC 160 in VDC 144 allows VDC 144 to assist another entity, such as network management FAM 121, to find and communicate with the appropriate corresponding FCM, such as network management FCM 131. In this manner, VDC 144 utilizes the common interface pointer which was returned from network management FCM 131 to facilitate communication between network management FAM 121 and network management FCM 131. In addition, as previously mentioned, the uniform and consistent external interface of network management FCM 131 allows network management FAM 121 to know how to communicate with network management FCM 131, regardless of the VDC network management in which FCM 131 is running.

Figure 7:
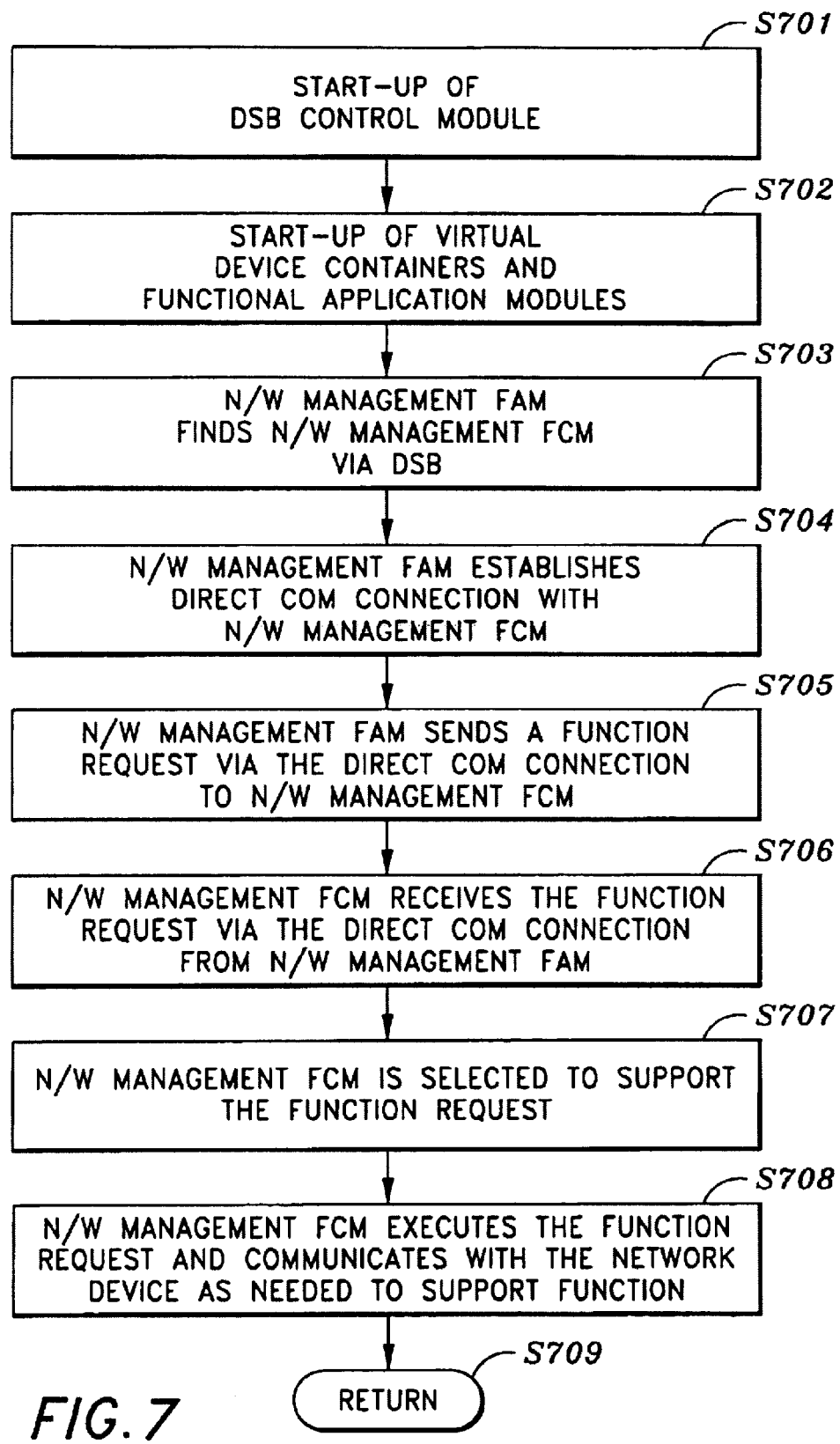
FIG. 7 is a flowchart for explaining the operation of the object-based architecture according to one embodiment of the present invention.

FIG. 7 is a flowchart for explaining the operation of the object-based architecture of the present invention. In step S701, DSB control module 152 is loaded and started in server 11, which as previously mentioned, is performed at power-up of server 121 or upon receipt of a reset command. In this manner, DSB 150 is implemented by DSB control module 152 for supporting the various nodes of the object-based architecture. During this step, DSB control module 152 listens for announced messages from other nodes on DSB 150 as the other nodes are started-up, and then registers node address 178 and node type descriptor 179 corresponding to each detected node on DSB 150 into a separate node entry in node map 154. DSB functions 155 is used to act as an arbiter for all DSB messages on DSB 150.

In step S702 each of virtual device containers 33 and functional application modules 31 are started-up, preferably at power-up of server 11 or upon receipt of a reset command. At start-up, each VDC uses an operating system function call from OS functions 159 to obtain a globally unique identifier (GUID) and then registers the GUID in OS registry 158. The GUID is for subsequent use by another entity that wishes to establish a connection with the VDC. Each VDC then loads an instance of each one of FCMs 32 needed for that particular VDC, and announces its presence on DSB 150 with an announcement bus message via its respective DSBC, such as DSBC 160. DSB control module 152 places a node entry corresponding to each VDC into node map 154 containing node address 178 and node type descriptor 179 corresponding to the particular VDC. Similarly, all functional application modules are started, after which they announce their presence and are entered into node map 154 in the same manner as the VDCs described above.

In step S703, network management FAM 121 finds network management FCM 131 via DSB 150. This is achieved by having network management FAM 121 send a lookup bus message over DSB 150 to DSB control module 152 in order to find the node address corresponding to virtual device container 144 for network printer 15. In this respect, the lookup bus message can contain an identifier such as node type descriptor 179 which identifies network printer 15 or VDC 144. It can be appreciated that other forms of lookup bus messages can be utilized, such as a lookup bus message that simply asks DSB control module 152 for all existing nodes on DSB 150. In this manner, a functional application module, such as network management FAM 121, can stay apprized of all nodes currently present on DSB 150. In any event, DSB control module 152 sends node address 178 of the corresponding node entry to network management FAM 121.

Network management FAM 121 then contacts VDC 144 by sending a bus message over DSB 150 to VDC 144 using the obtained node address. Virtual device container 144 responds to the bus message by sending a bus message to network management FAM 121 which contains the VDC's GUID and the common interface pointer for network management FCM 131. The VDC's GUID can be used subsequently in order to allow network management FAM 121 to establish a direct and more efficient communication connection with network management FCM 131. Next, network management FAM 121 sends bus messages over DSB 150 to network management FCM 131 using the VDC node address and the common interface pointer corresponding to network management FCM 131.

Next, in step S704, network management FAM 121 establishes a direct connection with network management FCM 131, thereby establishing a direct, efficient connection between the two nodes for supporting data exchange and function calls without having to go through DSB 150. This direct connection is established by having network management FAM 121 send a negotiation bus message over DSB 150 to network management FCM 131 by using the node address corresponding to VDC 144 and the common interface pointer for FCM 131. The negotiation bus message initiates a series of negotiation bus messages between network management FAM 121 and network management FCM 131 during which the two nodes agree upon a software connectivity standard for supporting a direct custom connection.

When a standard is agreed upon for the direct connection, such as the "COM" software connectivity standard, network management FAM 121 establishes the direct connection with network management FCM 131 by using the globally-unique identifier of VDC 144 and the common interface pointer of network management FCM 131 which were previously sent to network management FAM 121. Accordingly, network management FAM 121 and network management FCM 131 can now conduct data exchange and function calls between themselves via the direct connection. It should be noted that COM is only one example of a direct-connection software connectivity standard that can be utilized in the present invention. Accordingly, other software connectivity standards can be utilized such as JAVA, JINI, CORBA, etc., thereby increasing the probability that two nodes on DSB 150 can find a commonly-supported software connectivity standard for a direct custom connection.

Returning to the flowchart of FIG. 7, flow passes to S705 in which network management FAM 121 sends a function request via the direct connection to network management FCM 131. It can be appreciated that the function request can contain either a request for data exchange to and from network printer 15, or a function request requiring a function to be performed either virtually in network management FCM 131 or actually within network printer 15. Network management FCM 131 receives the function request via the direct connection from network management FAM 121 in step S706. In step S707, network management FCM 131 is selected in response to receipt of the function request to support the function request. Accordingly, in step S708, network management FCM 131 executes the function request and concurrently communicates with the network device which it supports, network printer 15, via network 10 to support execution of the function request. For example, the function request may require network management FCM 131 to read and/or write information to/from a memory in network printer 15, such as a memory on a network interface board of network printer 15. Flow then passes to return in step S709. A more detailed explanation of the foregoing object-based architecture is provided in above-referenced U.S. patent application Ser. No. 09/664,531.

Figure 8:
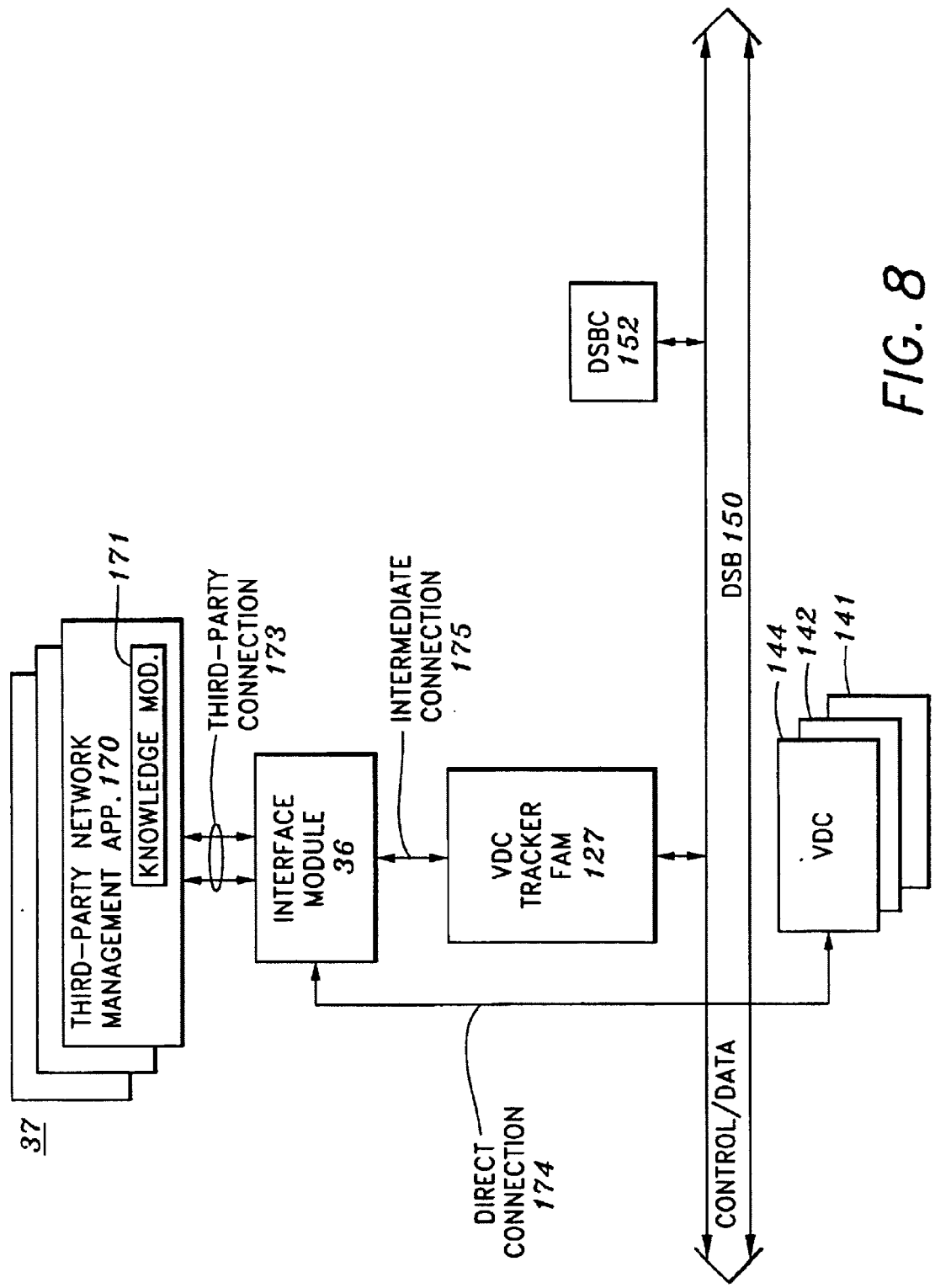
FIG. 8 is a block diagram for explaining the functionality of an interface module of the server according to one embodiment of the invention.

FIG. 8 provides a block diagram for explaining the functionality of interface module 36 according to one embodiment of the present invention. Specifically, the object-based architecture of FIG. 6 is depicted in FIG. 8 by the presence of virtual device containers (VDCs) 141, 142 and 144, dedicated software bus (DSB) 150, dedicated software bus controller (DSBC) 152, and VDC tracker functional application module (FAM) 127. The functionality of these components was generally explained above in relation to FIGS. 6 and 7, and is explained in more detail in the above-referenced U.S. patent application Ser. No. 09/664,531. As seen in FIG. 8, interface module 36 is provided to create a communication bridge between third-party network applications 37 and the object-based architecture described above. In particular, interface module 36 is shown in connection with third-party network management application 170 via third-party connection 173. Interface module 36 is also connected to VDC tracker FAM 127 via intermediate connection 175, and is capable of establishing a direct connection, such as direct connection 174, with each of VDCs 141, 142 and 144.

Preferably, third-party network management application 170 is initiated by a user of server 11, such as at power-up or re-boot of server 11. Third-party network management application 170 then initiates execution of interface module 36 and establishes third-party connection 173. The object-based architecture of FIG. 8 is preferably already initialized and executing from the power-up or re-boot of server 11. If, on the other hand, VDC tracker FAM 127 is not already running, interface module 36 initializes the execution of VDC tracker FAM 127, which in turn initializes the execution of VDCs 141, 142 and 144, along with DSBC 152, and DSB 150. Whether or not VDC tracker FAM 127 is already running, interface module 36 establishes intermediate connection 175. A direct connection between interface module 36 and each VDC, such as direct connection 174, is established by interface module 36 on an as-needed basis. The establishment of direct connection 174 is described in more detail below.

Third-party connection 173 is preferably a standard data interface having a an input channel and an output channel. In this manner, third-party connection 173 is a virtual connection between third-party network management application 170 and interface module 36 which is established through conventional data APIs, thereby creating input and output data pipes between the two modules. A predefined, basic set of commands is used to communicate between third-party network management application 170 and interface module 36, as will be explained in more detail below. Intermediate connection 175 between interface module 36 and VDC tracker FAM 127 is preferably a standard interface connection, such as a COM connection, which is supported by an operating system component interoperability standard. In this manner, intermediate connection 175 is a virtual software connection between interface module 36 and VDC tracker FAM 127 which is established through conventional COM APIs. In the same manner, direct connection 174 between interface module 36 and VDC 144 is a also COM connection as described above.

Interface module 36 therefore provides a simple and efficient communication bridge between third-party network management application 170 and VDCs 141, 142 and 144 of the object-based architecture. VDC tracker FAM 127 obtains a unique address pointer, and related identification information, for each VDC connected to DSB 150. Preferably, VDC tracker FAM 127 obtains the address pointer and related identification information for each VDC at the initialization of VDC tracker FAM 127. For example, VDC tracker FAM 127 preferably sends a discovery request over DSB 150 via DSBC 152 to detect the presence of all VDCs on DSB 150. The discovery request from VDC tracker FAM 127 is a predetermined software bus message which is supported by DSBC 152. Each VDC on DSB 150, such as VDCs 141, 142 and 144, returns a unique address pointer and identification information corresponding to that particular VDC to VDC tracker FAM 127. Such information includes, but is not limited to, the type and identity of each network device which each VDC supports. VDC tracker FAM 127 then preferably sends subsequent discovery requests on a frequent basis to discover new VDCs which may be initialized and connected to DSB 150. Accordingly, it can be appreciated that VDC tracker FAM 127 maintains unique address pointers and identification information corresponding to each VDC on DSB 150, and that such information can be accessed by interface module 36 via intermediate connection 36. In this manner, interface module 36 can obtain information for each VDC on DSB 150 from VDC tracker FAM 127 via intermediate connection 175. Interface module 36 can then use the unique address pointer for a particular VDC to establish a direct connection, such as direct connection 174, to a particular VDC, such as VDC 144. In this manner, interface module 36 can obtain data from, and send data and/or commands to, the particular VDC.

As seen in FIG. 8, third-party network management application 170 preferably includes knowledge module 171 which supports the predetermined set of commands for communicating over third-party connection 173 with interface module 36. In this manner, a third-party application can easily implement the ability to interface with the object-based architecture of FIGS. 6 and 8 by incorporating knowledge module 171. Knowledge module 171 is utilized to obtain information related to all VDCs on DSB 150 through interface module 36. As described above, knowledge module 171 is comprised of hierarchical modules such as sub-knowledge modules for tracking information related to a particular type of network devices, and device-modules for tracking information related to a particular network device. In this manner, third-party network management application 170 communicates with interface module 36 via interface commands 38 to obtain information related to each VDC on DSB 150, and to send data and/or commands to each VDC. Accordingly, interface module 36 provides a simple, efficient mechanism for third-party applications 37 to interface with the VDCs of the object-based architecture shown in FIGS. 6 and 8, even though each of third-party applications 37 does not have the ability to directly communicate over DSB 150 with any of the component modules in the object-based architecture.

As mentioned above, interface module 36 provides an interface between third-party applications 37 and VDCs 141, 142 and 144 through the series of simple, predetermined commands in interface commands 38. The commands in interface commands 38 are simple, DOS-like commands that take advantage of the basic nature of the pipes established between one of third-party applications 37, such as third-party network management application 170, and interface module 36 in third-party connection 173. Interface commands 38 are therefore supported by interface module 36 and by each of third-party applications 37, such as third-party network management application 170. As discussed earlier, interface commands 38 may be supported within a sub-module, such as knowledge module 171, of each of third-party applications 37.

Figure 9:
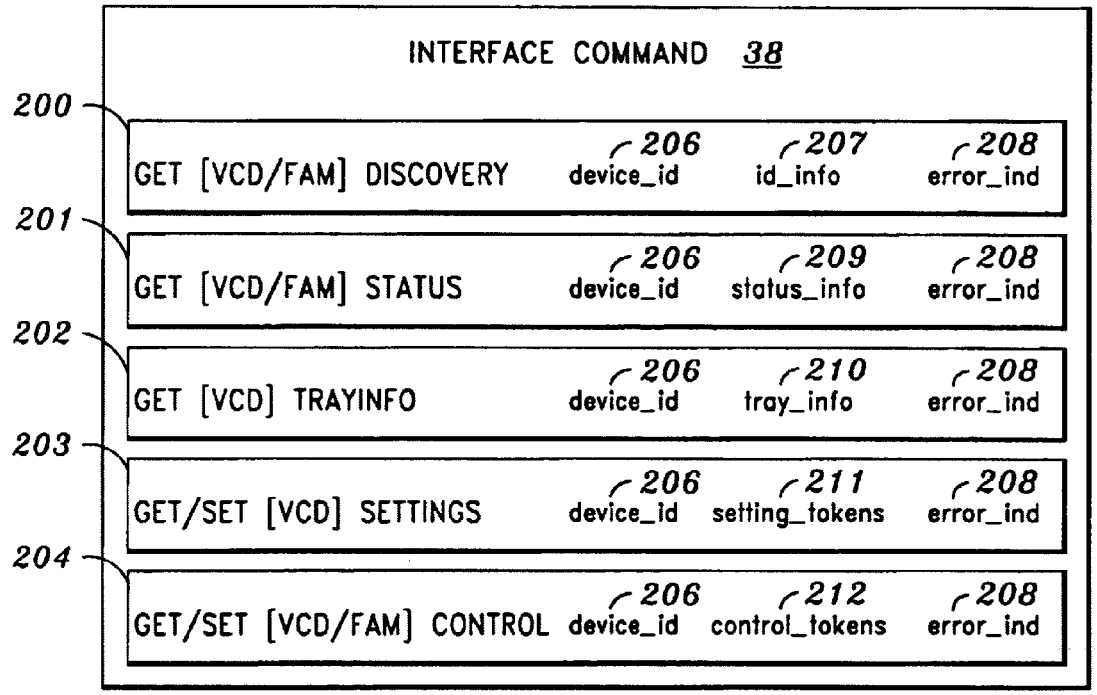
FIG. 9 is a diagram for explaining representative commands that facilitate communication between the interface module and third party applications on the server.

FIG. 9 provides an explanation of commands that may be contained in interface commands 38. The commands shown in FIG. 9 are examples of some of the basic commands that may be used to facilitate communication between interface module 36 and each of third-party applications 37, and is not intended to be an exhaustive list of all possible commands. Turning to FIG. 9, the commands include GET DISCOVERY 200, GET STATUS 201, GET TRAYINFO 202, GET/SET SETTINGS 203, and GET/SET CONTROL 204.

GET DISCOVERY 200 is sent by third-party applications 37 to interface module 36 in order to receive identification information and other related information for each module, such as VDCs 33 and FAMs 31, which is present on DSB 150 in the object-based architecture. This information is desirable so that one of third-party applications 37 can have access to the status and functionality of one or more network devices, such as a network printer, represented by a VDC. As seen in FIG. 9, GET DISCOVERY 200 includes an argument for a choice of [VDC/FAM] so that one of third-party applications 37 can select information related to one or more VDCs on DSB 150, or related to one or more FAMs on DSB 150. The command line of GET DISCOVERY 200 also includes the arguments of device_id 206, id_info 207, and error_ind 208. Device_id 206 is set to indicate a particular VDC or FAM for which information is requested. In this manner, one of third-party applications 37, such as third-party network management application 170, can select a particular network device for which information is desired.

Figure 10:
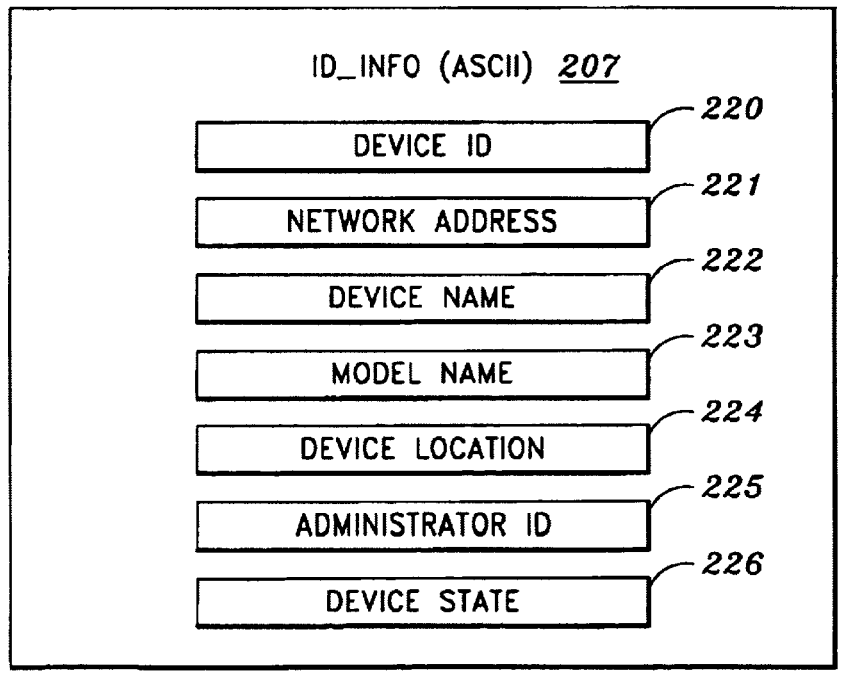

Id-info 207 is a string of return data to provide identification information and other related information for the desired network devices. Id-info 207 is preferably in a simple format, such as ASCII, and is described further in FIG. 10. As seen in FIG. 10, id_info 207 includes fields to contain return values for device id 220 to identify the identification of the particular network device, network address 211 to indicate the address on the network for the particular network device, device name 222 to indicate a given name for the particular network device, model name 223 to indicate the model of the particular network device, device location 224 to indicate the physical location of the particular network device, administrator id 225 to indicate the name of a network administrator responsible for the particular network device, and device state 230 which provides a bitmap for indicating the status of the particular network device. Device state 230 is described in more detail below with respect to FIG. 11. Of course, when information regarding multiple network devices is requested, id_info 207 is comprised of a return string containing multiple sets of the aforementioned value fields, wherein each set corresponds to a separate network device.

Error_ind 208 is a returned value to indicate the status of the command, in this case GET DISCOVERY 200, which was sent to interface module 36. Specifically, as shown in table 275 of FIG. 15, error_ind 208 can have one of values 0, −1, −2, 1, 100+. The value of 0 indicates that the command was successful; the value of −1 indicates that the command did not contain enough arguments; the value of −2 indicates that the command is not yet implemented on the system and therefore cannot be executed; the value of 1 indicates that the command requests information that is not available for some reason; and the value of 100+ indicates that a particular command argument is invalid (e.g. 102 means that the second argument is invalid). In this manner, the third-party application that sent the command is provided with an error indication as to whether the command was successful or whether there was a problem with the command.

Returning to FIG. 9, GET STATUS 201 is a command which is structured similar to GET DISCOVERY 200. GET STATUS 201 includes an argument for a choice of [VDC/FAM] so that one of third-party applications 37 can select to receive status information related to one or more VDCs on DSB 150, or related to one or more FAMs on DSB 150. GET STATUS 201 also includes the arguments of device_id 206, status_info 209, and error_ind 208. Device_id 206 was described above; status_info 209 is a returned sequence of number values to indicate various status aspects of a particular network device, and is described in more detail below with respect to FIG. 11; and error_ind 208 was described above.

Turning to FIG. 11, status_info 209 is seen to contain a sequence of number values, each of which represents the status of a particular feature of the network device. Status_info 209 contains two sequences of number values, the first of which is dynamic tokens 228 and the second of which is static tokens 229. Dynamic tokens 228 represents features of the network device which are dynamic and likely to change, and therefore are monitored frequently by the VDC which supports the network device. Static tokens 229 represents features of the network device which are static and less likely to change, and therefore are monitored less frequently by the VDC which supports the network device.

As seen in FIG. 11, dynamic tokens 228 includes device_state 230 which is a bitmap to indicate basic status of the network device. As seen in bitmap 245 of FIG. 11, when bit 0 of device_state is 1, a valid status has been obtained from the network device. When bit 1 of device_state is 1, valid features have been obtained from the network device. When bit 2 of device_state is 1, valid setup values have been obtained from the network device. When bit 3 of device_state is 1, the network device is responding. When bit 4 of device_state is 1, the network device is ready. When bit 5 of device_state is 1, the network device is warming up. When bit 6 of device_state is 1, the network device is printing.

Dynamic tokens 228 also includes paper_jam 231 to indicate whether the network device, such as a network printer, has a paper jam; toner_low 232 which indicates whether the network device, such as a network printer, has low toner; toner_out 234 which indicates whether the network device, such as a network printer, is out of toner; cover_open 235 which indicates whether the network device, such as a network printer, has an open cover; service_call 236 which indicates whether the network device, such as a network printer, needs a particular service call; feeder_jam 237 which indicates whether the network device, such as a network printer, has a paper feeder jam; finisher_jam 239 which indicates whether the network device, such as a network printer, has a jam in the finisher section; fax_memory_full 240 which indicates whether the network device, such as a network fax/printer, has a full fax memory; stapler_error 241 which indicates whether the network device, such as a network printer, has a stapler error; hard_disk_space_avail 242 which indicates the amount of disk space available for the network device; and memory_usage 244 which indicates the amount of memory being used in the network device.

Static tokens 229 includes memory_size 247 which indicates the size of the memory in the network device; scanner_capability 249 which indicates whether the network device, such as a network printer, has the capability to scan documents; fax_capability 250 which indicates whether the network device, such as a network printer, has the capability to fax documents; hard_disk_size 251 which indicates the size of the hard disk in the network device; pages_per_minute 252 which indicates the size of the printing speed of the network device, such as a network printer; max_resolution_in_dpi 254 which indicates the maximum printing resolution of the network device, such as a network printer; auto_doc_feeder 255 which indicates whether the network device, such as a network printer, has an automatic document feeder; duplexer_capability 256 which indicates whether the network device, such as a network printer, has capability to support duplexing; stapler_capability 257 which indicates whether the network device, such as a network printer, has the capability to support stapling; postscript_capability 258 which indicates whether the network device, such as a network printer, has capability to support postscript; and PCL_capability 259 which indicates whether the network device, such as a network printer, has capability to support PCL. Accordingly, a third-party application can use the GET STATUS 201 to obtain significant amounts of information regarding a particular network device supported by the object-based architecture depicted in FIGS. 6 and 8.

Returning to FIG. 9, GET TRAYINFO 202 is a command which is also structured similar to GET DISCOVERY 200. GET TRAYINFO 202 applies only to VDCs so that one of third-party applications 37 can select to receive tray-related information for one or more VDCs on DSB 150. GET TRAYINFO 202 also includes the arguments of device_id 206, tray_info 210, and error_ind 208. Device_id 206 was described above; tray_info 210 is a returned sequence values to indicate various status aspects of the feed trays of a particular network device, and is described in more detail below with respect to FIG. 12; and error_ind 208 was described above.

As seen in FIG. 12, tray_info 210 contains tray name 260 to indicate the name of a particular tray, paper type 261 to indicate the type of paper in the tray identified in tray_info 210, and paper level 262 to indicate the level of paper in the tray identified in tray_info 210. Paper level 262 is represented by a number value as depicted in table 264. If paper level 262 is 0, the tray is empty and is in an alarm state. If paper level 262 is 1, the tray has at least one sheet of paper. If paper level 262 is 25 to 100, the value indicates the percentage of fullness of the tray, and the tray is in a state of warning if the tray is 25 or 33 percent full. If paper level 262 is 128, the tray is open and is in an alarm state. If paper level 262 is 255, the tray level function is not supported.

The next command described in FIG. 9 is GET/SET SETTINGS 203 is a command which is also structured similar to GET DISCOVERY 200. GET/SET SETTINGS 203 applies only to VDCs so that one of third-party applications 37 can select to receive or send settings information for one or more VDCs on DSB 150. GET/SET SETTINGS 203 also includes the arguments of device_id 206, setting_tokens 211, and error_ind 208. Device_id 206 was described above; setting_tokens 211 is a sequence of setting values which is either set by the third-party application for the SET command, or which is returned to the third-party application for the GET command. Setting_tokens 211 is described in more detail below with respect to FIG. 13, and error_ind 208 was described above. In this manner, GET/SET SETTINGS 203 is used by a third-party application to either obtain, or to set, a certain group of settings for a network device.

As seen in FIG. 13, setting_tokens 211 includes device_name 265 which corresponds to the name of the network device, location 266 which corresponds to the physical location of the network device, and contact_name 267 which corresponds to a name of a person responsible for the network device, such as a network administrator.

The last command described in FIG. 9 is GET/SET CONTROL 204 is a command which is also structured similar to GET DISCOVERY 200. GET/SET CONTROL 204 includes an argument to select FAMs or VDCs so that one of third-party applications 37 can select to receive or send control information for one or more FAMs on DSB 150, or for one or more VDCs on DSB 150. GET/SET CONTROL 204 also includes the arguments of device_id 206, control_tokens 212, and error_ind 208. Device_id 206 was described above; control_tokens 212 is a sequence of control values which is either set by the third-party application for the SET command, or which is returned to the third-party application for the GET command. Control_tokens 212 is described in more detail below with respect to FIG. 14, and error_ind 208 was described above. In this manner, GET/SET CONTROL 204 is used by a third-party application to either obtain, or to set, a certain group of control variables for a network device.

As seen in FIG. 14, control_tokens 212 includes test_print 270 which is a command that is executed by the network device to print a test print page, reboot 271 which is a command that is executed by the network device to reboot the network interface of the network device. Reset_factory_dflts 272 is a command that is executed by the network device to reset the print settings of the network device to the original factory default settings. In this manner, a third-party application can utilize GET/SET CONTROL 204 to GET the list of commands supported by the network device, or to SET commands to be executed by the network device.

Each of interface commands 38 shown in FIG. 9 either receives information, or sends information to, one or more VDCs, which in turn is obtained, or sent to, the network device supported by the VDC via the network. This is achieved through the utilization of interface module 36 and its interface with the object-based architecture. Specifically, interface module 36 interfaces with VDC tracker 127 through intermediate connection 127 to obtain the identity of all nodes, such as VDCs, on DSB 150, and to obtain a unique address pointer corresponding to each node. As mentioned above, VDC tracker 127 obtains this information via DSB 150 at start-up and through continuous discovery requests. Once interface module 36 has obtained the unique address pointer for a particular node, such as VDC 144, interface module 36 can establish a direct connection, such as direct connection 174, to the VDC. Interface module 36 can then use the direct connection to obtain information from, and to send information to, the particular VDC. This information exchange can include data, status, settings and commands, among other things. In this manner, interface module 36 can provide a bridge between third-party applications 37 and the VDCs in the object-based architecture in order to support interface commands 38 sent from third-party applications 37 to interface module 36.

Figure 16:
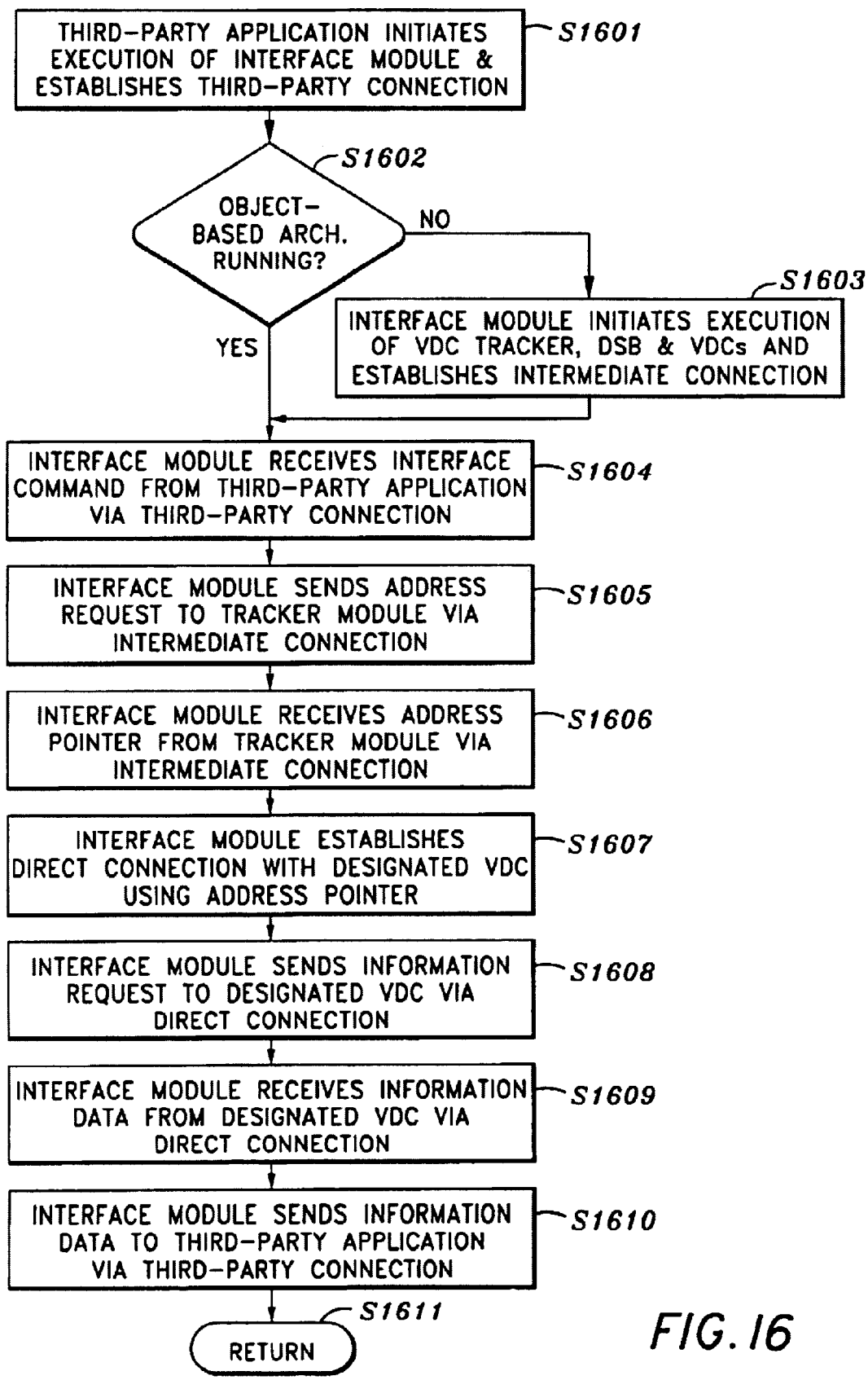
FIG. 16 is a flow chart for explaining the relationship between third party applications, the interface module and virtual device containers (VDCs).

FIG. 16 contains a flowchart which describes an example of the relationship between third-party applications 37, interface module 36 and the VDCs, such as VDCs 141, 142 and 144, in support of one of the commands in interface commands 38. Turning to step S1601 of FIG. 16, one of third-party applications 37 initiates the execution of interface module 36 and establishes third-party connection 173 between third-party applications 37 and interface module 36. Next, in step S1602, it is determined whether the object-based architecture is already running. If not, flow passes to step S1603, in which interface module 36 initiates execution of the components of the object-based architecture, such as VDC tracker application 127, DSB 150, DSBC 152 and VDCs 141, 142 and 144. Flow then passes to step S1604. If it is determined in step S1602 that the object-based architecture is already running, flow passes to step S1604.

In step S1604, interface module 36 receives one of interface commands 38, such as GET DISCOVERY 200, from a third-party application via third-party connection 173, wherein the command relates to at least one designated VDC, such as VDC 144. In response to this command, interface module 36 sends an address request to VDC tracker application 127 via intermediate connection 175, wherein the address request is related to the at least one designated VDC (step S1605). Interface module 36 then receives a unique address pointer from VDC tracker application 127 via intermediate connection 175, wherein the unique address pointer corresponds to the at least one designated VDC (step S1606).

In step S1607, interface module establishes direct connection 174 to designated VDC 144 using the unique address pointer. Next, interface module 36 sends an information request to designated VDC 144 via direct connection 174, wherein the information request corresponds to the interface command received by interface module 36 from the third-party application (step S1608). In step S1609, interface module 36 receives the requested information data from designated VDC 144 via direct connection 174. Interface module 36 then sends the information data to the third-party application via third-party connection 173 in response to the interface command sent by the third-party application (step S1610). Flow then passes to return in step S1611.

The above example of FIG. 16 illustrates the inter-relationships between third-party applications 37, interface module 36 and VDC 144 in support of one of interface commands 38, such as GET DISCOVERY to obtain data from VDC 144 regarding one or more network devices. It can be appreciated that the foregoing inter-relationships are used in a similar manner to support the other commands of interface commands 38 to obtain, or send, information, status, settings and control commands between third-party applications 37 and any one of the VDCs in the object-based architecture.

FIG. 17 provides another embodiment of the present invention in which interface module 36 is in communication with more than one type of tracking module so as to support communication with multiple object-based architectures. In this manner, interface module 36 provides third-party applications 37 with the ability to interact with multiple groups of network devices which are supported by separate and distinct object-based architectures. As seen in FIG. 17, the object-based architecture previously shown in FIG. 8 is provided, along with interface module 36 and third-party applications 37, and their associated connections. In addition, FIG. 17 also shows a second object-based architecture comprised of tracker module 187, and device modules 181, 182 and 184. Similar to FIG. 8, interface module 36 has intermediate connection 185 with tracker module 187, and has the ability to establish direct connection 189 with one of the device modules, such as device module 184. Accordingly, interface module 36 can support multiple object-based architectures to allow third-party applications 37 to interface with the network devices supported by the architectures without requiring third-party applications 37 to directly support an interface to each of the architectures. Of course, it can be appreciated that other combinations and types of architectures than those in FIG. 17 can be supported by interface module 36.

Based on the above discussion and accompanying figures, a simple and efficient interface is established for third-party applications to communicate with an open, object-based architecture which virtually extends the functional capabilities of network devices on a network. It should be noted that the protocols used herein and examples of network-based applications used herein are for illustrative purposes and that the interface module of the present invention can be used to support various different protocols and network-wide applications in order to interface with the components within one or more object-based architectures.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A method for interfacing a plurality of virtual device container modules to a third-party application, each of the virtual device container modules being in communication with a tracker module through a software bus, said method comprising the steps of:

receiving an interface command at an interface module from the third-party application via a third-party connection, the interface command relating to a designated one of the plurality of virtual device container modules;

establishing a direct connection between the interface module and the designated virtual device container module by using an address pointer; received from the tracker module receiving information data, at the interface module, from the designated virtual device container module via the direct connection, the information data relating to the designated virtual device container module; and sending the information data from the interface module to the third-party application via the third-party connection.

2. A method according to claim 1, further including the steps of:

sending an address request from the interface module to the tracker module via an intermediate connection, the address request relating to the designated virtual device container module; and receiving, at the interface module, the address pointer from the tracker module via the intermediate connection, the address pointer relating to the designated virtual device container module.

3. A method according to claim 2, wherein the interface module initiates execution of the tracker module and establishes the intermediate connection.

4. A method according to claim 1, wherein the information data is received in response to an information request which is sent from the interface module to the designated virtual device container module via the direct connection.

5. A method according to claim 4, wherein the intermediate connection is a standard interface connection.

6. A method according to claim 5, wherein the standard interface connection is supported by an operating system component interoperability standard.

7. A method according to claim 5, wherein the standard interface connection is a COM connection.

8. A method according to claim 1, wherein each of the virtual device container modules corresponds to a network device.

9. A method according to claim 8, wherein the network device is a network printer.

10. A method according to claim 8, wherein the network device is a network copier.

11. A method according to claim 8, wherein the network device is a network scanner.

12. A method according to claim 4, wherein the address request is a standard interface command.

13. A method according to claim 12, wherein the standard interface command is supported by an operating system component interoperability standard.

14. A method according to claim 12, wherein the standard interface command is a COM command.

15. A method according to claim 1, wherein the third-party application is a network management application.

16. A method according to claim 1, wherein the third-party application is an e-mail printing application.

17. A method according to claim 1, wherein the third-party application is a network security application.

18. A method according to claim 1, wherein the third-party application is a resource management application.

19. A method according to claim 1, wherein the third-party application is a print job accounting application.

20. A method according to claim 1, wherein the software bus is managed by a software bus control module.

21. A method according to claim 20, wherein each virtual device container module and the tracker module contain a software bus connector module which supports communication over the software bus.

22. A method according to claim 21, wherein communication over the software bus between the software bus connector modules over the software bus is implemented by using a plurality of different software bus messages.

23. A method according to claim 22, wherein the software bus includes a data channel and a command channel.

24. A method according to claim 22, wherein one of the software bus messages is a discovery request for identification information corresponding to each of the virtual device container modules.

25. A method according to claim 22, wherein the software bus messages are supported by a plurality of different communication protocols.

26. A method according to claim 1, wherein communication over the software bus is implemented in one of a plurality of different communication protocols.

27. A method according to claim 1, wherein the tracker module obtains a unique address pointer from each virtual device container module via the software bus in response to a discovery request sent from the tracker module over the software bus to the plurality of virtual device container modules.

28. A method according to claim 1, wherein the third-party connection is a standard data interface.

29. A method according to claim 28, wherein the standard data interface has an input channel and an output channel.

30. A method according to claim 28, wherein the standard data interface includes two standard data pipes.

31. A method according to claim 1, wherein the interface command is one of a set of predefined commands.

32. A method according to claim 31, wherein the set of predefined commands are supported by the interface module.

33. A method according to claim 31, wherein the set of predefined commands are implemented in the third-party application.

34. A method according to claim 31, wherein the set of predefined commands includes a get-command which requests the information data from a designated virtual device container module.

35. A method according to claim 34, wherein the information data is received in response to the get-command in ASCII format.

36. A method according to claim 31, wherein the set of predefined commands includes a set-command which sends settings to a designated virtual device container module.

37. A method according to claim 31, wherein an error indicator is returned in response to one of the set of predefined commands.

38. A method according to claim 31, wherein the set of predefined commands includes a discovery request which requests identification information for each module communicating through the software bus.

39. A method according to claim 31, wherein the set of predefined commands includes a discovery request which requests identification information for each virtual device container module of a designated device type.

40. A method according to claim 36, wherein the identification information includes a device identifier for the designated virtual device container module.

41. A method according to claim 39, wherein the identification information includes a network address for the designated virtual device container module.

42. A method according to claim 39, wherein the identification information includes a device name for the designated virtual device container module.

43. A method according to claim 39, wherein the identification information includes a model name for the designated virtual device container module.

44. A method according to claim 39, wherein the identification information includes a device location for the designated virtual device container module.

45. A method according to claim 39, wherein the identification information includes an administrator identification for the designated virtual device container module.

46. A method according to claim 39, wherein the identification information includes status information for the designated virtual device container module.

47. A method according to claim 31, wherein the set of predefined commands includes a status request which requests status information for a designated virtual device container module.

48. A method according to claim 47, wherein the status information includes a plurality of status tokens, each status token representing a unique device property status.

49. A method according to claim 48, wherein the plurality of status tokens includes at least one status token corresponding to an operational state of the device.

50. A method according to claim 48, wherein the plurality of status tokens includes at least one status token corresponding to a device capability.

51. A method according to claim 48, wherein the plurality of status tokens includes at least one status token corresponding to a device hardware specification.

52. A method according to claim 31, wherein the set of predefined commands includes a settings request which requests the receipt of settings information for a designated virtual device container module.

53. A method according to claim 52, wherein the settings information includes a device name, a device location and a device administrator identification for the designated virtual device container module.

54. A method according to claim 31, wherein the set of predefined commands includes a settings request which sends settings information to a designated virtual device container module.

55. A method according to claim 54, wherein the settings information includes a device name, a device location and a device administrator identification for the designated virtual device container module.

56. A method according to claim 31, wherein the set of predefined commands includes a control request which requests receipt of control information for a designated virtual device container module.

57. A method according to claim 56, wherein the control information includes a plurality of control tokens, each control token representing a functional operation which is supported by the designated virtual device container module.

58. A method according to claim 31, wherein the set of predefined commands includes a control request which sends control information to a designated virtual device container module.

59. A method according to claim 58, wherein the control information includes a plurality of control tokens, each control token representing a functional operation command for execution by the designated virtual device container module.

60. A method according to claim 1, wherein the direct connection is a standard interface connection.

61. A method according to claim 60, wherein the standard interface connection is supported by an operating system component interoperability standard.

62. A method according to claim 60, wherein the standard interface connection is a COM connection.

63. A method according to claim 1, wherein the information data is received from the designated virtual device container module via the direct connection through a standard interface command.

64. A method according to claim 63, wherein the standard interface command is supported by an operating system component interoperability standard.

65. A method according to claim 63, wherein the standard interface command is a COM command.

66. A method according to claim 1, wherein the tracker module maintains a unique address pointer for each virtual device container module.

67. A method according to claim 1, wherein the third-party application is a knowledge module.

68. A method according to claim 67, wherein the knowledge module contains a plurality of sub-modules, each sub-module corresponding to a respective virtual device container module for a type of network device.

69. A method according to claim 68, wherein each sub-module instantiates a plurality of device-modules, each device module corresponding to a network device.

70. A method according to claim 1, wherein the interface module initiates execution of the tracker module.

71. A method according to claim 1, wherein the third-party application initiates execution of the interface module and establishes the third-party connection.

72. A method according to claim 1, wherein the tracker module initiates execution of each of the plurality of virtual device container modules.

73. A method according to claim 72, wherein the tracker module receives a unique address pointer from each of the plurality of virtual device container modules via the software bus.

74. A method according to claim 73, wherein the unique address pointers are received in response to a discovery request sent from the tracker module to the plurality of virtual device container modules via the software bus.

75. A method according to claim 1, wherein the interface module is connected to a plurality of tracker modules via a plurality of intermediate connections, respectively.

76. A method according to claim 1, wherein an error indicator is returned with the information data.

77. A method for interfacing a plurality of virtual device container modules to a third-party application, each of the virtual device container modules being in communication with a tracker module through a software bus, said method comprising the steps of:

receiving an interface command at an interface module from the third-party application via a third-party connection, the interface command relating to a designated one of the plurality of virtual device container modules;

sending an address request from the interface module to the tracker module via an intermediate connection, the address request relating to the designated virtual device container module;

receiving, at the interface module, an address pointer from the tracker module via the intermediate connection, the address pointer relating to the designated virtual device container module;

establishing a direct connection between the interface module and the designated virtual device container module by using the address pointer;

sending an information request from the interface module to the designated virtual device container module via the direct connection;

receiving information data, at the interface module, from the designated virtual device container module via the direct connection, the information data relating to the designated virtual device container module; and sending the information data from the interface module to the third-party application via the third-party connection.

78. A computing device for interfacing a plurality of virtual device container modules to a third-party application, each of the virtual device container modules being in communication with a tracker module through a software bus, said computing device comprising:

a program memory for storing process steps executable to perform a method according to any of claims 1 to 77; and a processor for executing the process steps stored in said program memory.

79. Computer-executable process steps stored on a computer readable medium, said computer-executable process steps for interfacing a plurality of virtual device container modules to a third-party application, each of the virtual device container modules being in communication with a tracker module through a software bus, said computer-executable process steps comprising process steps executable to perform a method according to any of claims 1 to 77.

80. A computer-readable medium which stores computer-executable process steps, the computer-executable process steps to interface a plurality of virtual device container modules to a third-party application, each of the virtual device container modules being in communication with a tracker module through a software bus, said computer-executable process steps comprising process steps executable to perform a method according to any of claims 1 to 77.

* * * * *